(12) United States Patent
Kepley

(10) Patent No.: US 9,834,163 B2
(45) Date of Patent: *Dec. 5, 2017

(54) CENTRIPETAL PHASE SHIFT ISOLATION CONTROL SYSTEM, IN AN OSCILLATION CONFIGURATION OF TRANSPOSITION, DEFLECTION, DAMPEN, DISSIPATION, AND ISOLATION OF A STOCHASTIC VECTOR

(71) Applicant: Bruce Kepley, San Jose, CA (US)

(72) Inventor: Bruce Kepley, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,221

(22) Filed: Jul. 13, 2015

(65) Prior Publication Data

US 2015/0314745 A1     Nov. 5, 2015

Related U.S. Application Data

(63) Continuation-in-part of application No. 14/091,352, filed on Nov. 27, 2013, now Pat. No. 9,114,772.

(60) Provisional application No. 62/181,706, filed on Jun. 18, 2015.

(51) Int. Cl.
| | |
|---|---|
| *B60R 21/0132* | (2006.01) |
| *F16F 7/10* | (2006.01) |
| *B60R 21/01* | (2006.01) |
| *B60R 21/013* | (2006.01) |

(52) U.S. Cl.
CPC ........ *B60R 21/0132* (2013.01); *F16F 7/1005* (2013.01); *B60R 21/013* (2013.01); *B60R 2021/01286* (2013.01)

(58) Field of Classification Search
CPC .............. B60R 21/013; B60R 21/0132; B60R 2021/01286; F16F 7/1005
USPC .......................................................... 701/45
See application file for complete search history.

(56) References Cited

U.S. PATENT DOCUMENTS

| | | | |
|---|---|---|---|
| 2006/0202452 A1* | 9/2006 | Breed | B60R 21/0132 280/730.2 |
| 2006/0232052 A1* | 10/2006 | Breed | B60R 21/013 280/735 |
| 2008/0040004 A1* | 2/2008 | Breed | B60R 21/0134 701/45 |
| 2008/0243342 A1* | 10/2008 | Breed | B60R 21/0132 701/45 |
| 2009/0319212 A1* | 12/2009 | Cech | B60R 21/0136 702/65 |

* cited by examiner

*Primary Examiner* — Atul Trivedi
(74) *Attorney, Agent, or Firm* — Sheppard Mullin Richter & Hampton LLP

(57) ABSTRACT

The protected mass (PM) of a vehicle collision event, is signaled for deceleration, by oscillation cycling, or a single transposition and/or DDD of the PM, in isolation of an unprotected mass (UPM).

3 Claims, 15 Drawing Sheets

Figure 2
CHAMBER SECTION
UPON INITIATION
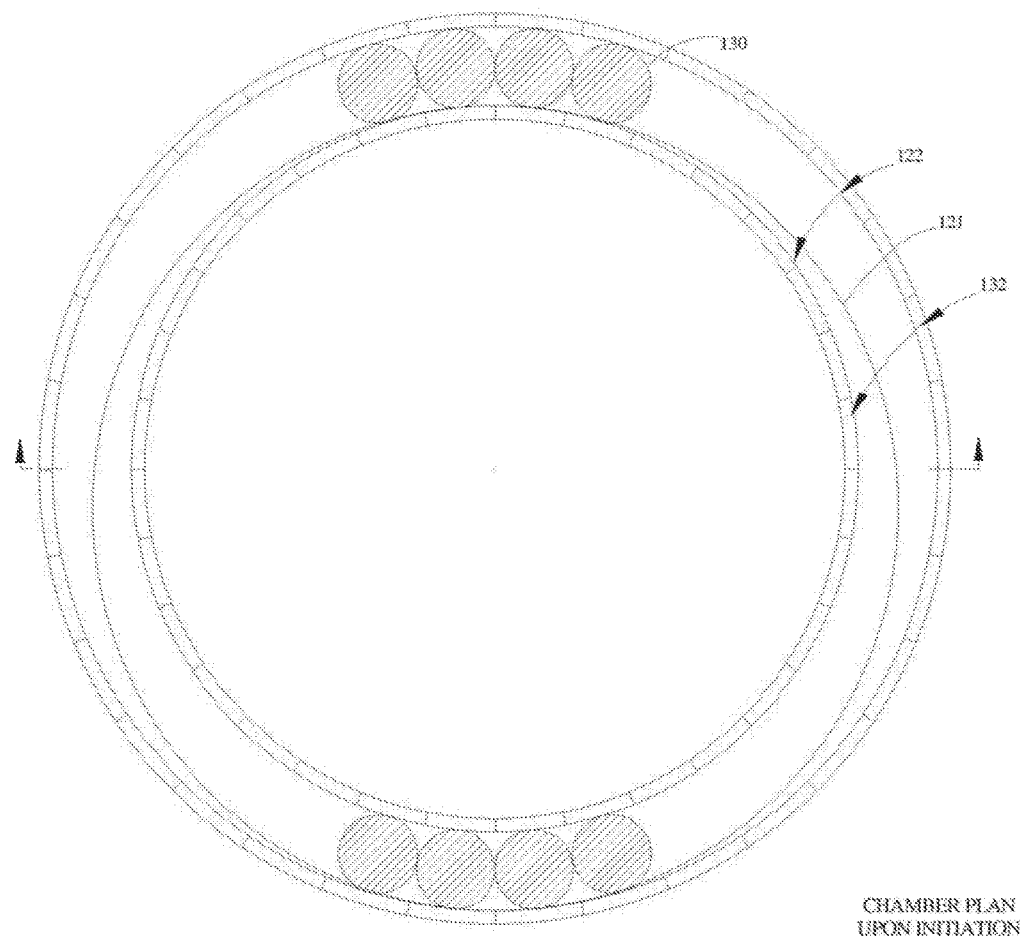
CHAMBER PLAN
UPON INITIATION Figure 5
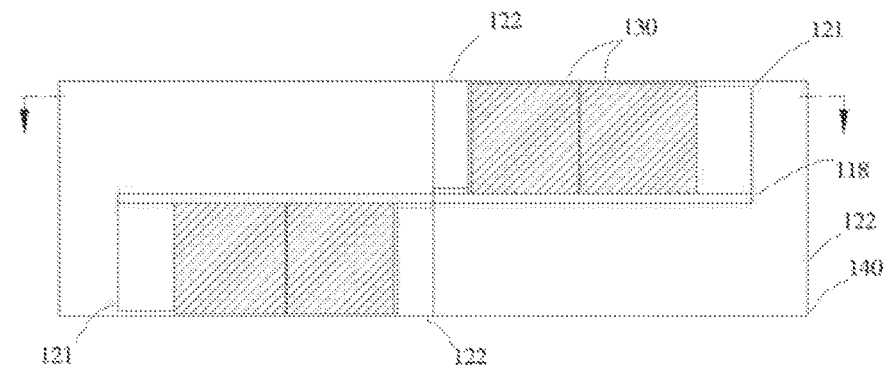
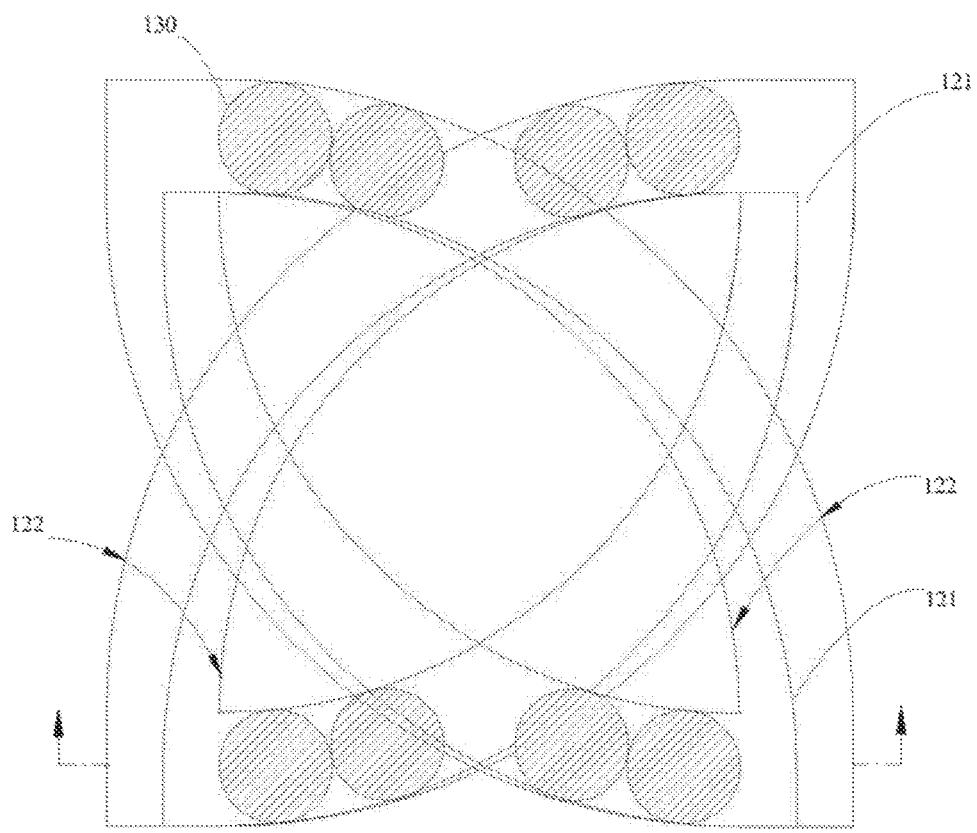

Figure 7

64 GAIT DATUM

Individual Gait / EE

| Inertia Bearing | PM Position | Gait | EE | Range CC Direction | C Direction |
|---|---|---|---|---|---|
| 0 | 180 | 1' | 1 | 0 - 348.75 | 0 - 11.25 |
| 11.25 | 191.25 | 2' | 2 | 11.25 - 0 | 11.25 - 22.5 |
| 22.5 | 202.5 | 3' | 3 | 22.5 - 11.25 | 22.5 - 33.75 |
| 33.75 | 213.75 | 4' | 4 | 33.75 - 22.5 | 33.75 - 45 |
| 45 | 225 | 5' | 5 | 45 - 33.75 | 45 - 56.25 |
| 56.25 | 236.25 | 6' | 6 | 56.25 - 45 | 56.25 - 67.5 |
| 67.5 | 247.5 | 7' | 7 | 67.5 - 56.25 | 67.5 - 78.75 |
| 78.75 | 258.75 | 8' | 8 | 78.75 - 67.5 | 78.75 - 90 |
| 90 | 270 | 9' | 9 | 90 - 78.75 | 90 - 101.25 |
| 101.25 | 281.25 | 10' | 10 | 101.25 - 90 | 101.25 - 112.5 |
| 112.5 | 292.5 | 11' | 11 | 112.5 - 101.25 | 112.5 - 123.75 |
| 123.75 | 303.75 | 12' | 12 | 123.75 - 112.5 | 123.75 - 135 |
| 135 | 315 | 13' | 13 | 135 - 123.75 | 135 - 146.25 |
| 146.25 | 326.25 | 14' | 14 | 146.25 - 135 | 146.25 - 157.5 |
| 157.5 | 337.5 | 15' | 15 | 157.5 - 146.25 | 157.5 - 168.75 |
| 168.75 | 348.75 | 16' | 16 | 168.75 - 157.5 | 168.75 - 180 |
| 180 | 0 | 1 | 1 | 180 - 168.75 | 180 - 191.25 |
| 191.25 | 11.25 | 2 | 2 | 191.25 - 180 | 191.25 - 202.5 |
| 202.5 | 22.5 | 3 | 3 | 202.5 - 191.25 | 202.5 - 213.75 |
| 213.75 | 33.75 | 4 | 4 | 213.75 - 202.5 | 213.75 - 225 |
| 225 | 45 | 5 | 5 | 225 - 213.75 | 225 - 236.25 |
| 236.25 | 56.25 | 6 | 6 | 236.25 - 225 | 236.25 - 247.5 |
| 247.5 | 67.5 | 7 | 7 | 247.5 - 236.25 | 247.5 - 258.75 |
| 258.75 | 78.75 | 8 | 8 | 258.75 - 247.5 | 258.75 - 270 |
| 270 | 90 | 9 | 9 | 270 - 259.75 | 270 - 281.25 |
| 281.25 | 101.25 | 10 | 10 | 281.25 - 270 | 281.25 - 292.5 |
| 292.5 | 112.5 | 11 | 11 | 292.5 - 281.25 | 292.5 - 303.75 |
| 303.75 | 123.75 | 12 | 12 | 303.75 - 292.5 | 303.75 - 315 |
| 315 | 135 | 13 | 13 | 315 - 303.75 | 315 - 326.25 |
| 326.25 | 146.25 | 14 | 14 | 326.25 - 315 | 326.25 - 337.5 |
| 337.5 | 157.5 | 15 | 15 | 337.5 - 326.25 | 337.5 - 348.75 |
| 348.75 | 168.75 | 16 | 16 | 348.75 - 337.5 | 348.75 - 360 |

Figure 8

| Inertia Bearing | PM Position | Gait Set | Gait Set EE Set | 180° Gait Set CC Direction | 64 GAIT DATUM 180° Gait Set C Direction |
|---|---|---|---|---|---|
| 0 | 180 | 1' | 15 16 1 2 | 1 13 9 5 | 1 5 9 13 |
| 11.25 | 191.25 | 2' | 16 1 2 3 | 2 14 10 6 | 2 6 10 14 |
| 22.5 | 202.5 | 3' | 1 2 3 4 | 3 15 11 7 | 3 7 11 15 |
| 33.75 | 213.75 | 4' | 2 3 4 5 | 4 16 12 8 | 4 8 12 16 |
| 45 | 225 | 5' | 3 4 5 6 | 5 1 13 9 | 5 9 13 1 |
| 56.25 | 236.25 | 6' | 4 5 6 7 | 6 2 14 10 | 6 10 14 2 |
| 67.5 | 247.5 | 7' | 5 6 7 8 | 7 3 15 11 | 7 11 15 3 |
| 78.75 | 258.75 | 8' | 6 7 8 9 | 8 4 16 12 | 8 12 16 4 |
| 90 | 270 | 9' | 7 8 9 10 | 9 5 1 13 | 9 13 1 5 |
| 101.25 | 281.25 | 10' | 8 9 10 11 | 10 6 2 14 | 10 14 2 6 |
| 112.5 | 292.5 | 11' | 9 10 11 12 | 11 7 3 15 | 11 15 3 7 |
| 123.75 | 303.75 | 12' | 10 11 12 13 | 12 8 4 16 | 12 16 4 8 |
| 135 | 315 | 13' | 11 12 13 14 | 13 9 5 1 | 13 1 5 9 |
| 146.25 | 326.25 | 14' | 12 13 14 15 | 14 10 6 2 | 14 2 6 10 |
| 157.5 | 337.5 | 15' | 13 14 15 16 | 15 11 7 3 | 15 3 7 11 |
| 168.75 | 348.75 | 16' | 14 15 16 1 | 16 12 8 4 | 16 4 8 12 |
| 180 | 0 | 1 | 15 16 1 2 | 1 13 9 5 | 1 5 9 13 |
| 191.25 | 11.25 | 2 | 16 1 2 3 | 2 14 10 6 | 2 6 10 14 |
| 202.5 | 22.5 | 3 | 1 2 3 4 | 3 15 11 7 | 3 7 11 15 |
| 213.75 | 33.75 | 4 | 2 3 4 5 | 4 16 12 8 | 4 8 12 16 |
| 225 | 45 | 5 | 3 4 5 6 | 5 1 13 9 | 5 9 13 1 |
| 236.25 | 56.25 | 6 | 4 5 6 7 | 6 2 14 10 | 6 10 14 2 |
| 247.5 | 67.5 | 7 | 5 6 7 8 | 7 3 15 11 | 7 11 15 3 |
| 258.75 | 78.75 | 8 | 6 7 8 9 | 8 4 16 12 | 8 12 16 4 |
| 270 | 90 | 9 | 7 8 9 10 | 9 5 1 13 | 9 13 1 5 |
| 281.25 | 101.25 | 10 | 8 9 10 11 | 10 6 2 14 | 10 14 2 6 |
| 292.5 | 112.5 | 11 | 9 10 11 12 | 11 7 3 15 | 11 15 3 7 |
| 303.75 | 123.75 | 12 | 10 11 12 13 | 12 8 4 16 | 12 16 4 8 |
| 315 | 135 | 13 | 11 12 13 14 | 13 9 5 1 | 13 1 5 9 |
| 326.25 | 146.25 | 14 | 12 13 14 15 | 14 10 6 2 | 14 2 6 10 |
| 337.5 | 157.5 | 15 | 13 14 15 16 | 15 11 7 3 | 15 3 7 11 |
| 348.75 | 168.75 | 16 | 14 15 16 1 | 16 12 8 4 | 16 4 8 12 |

Figure 9
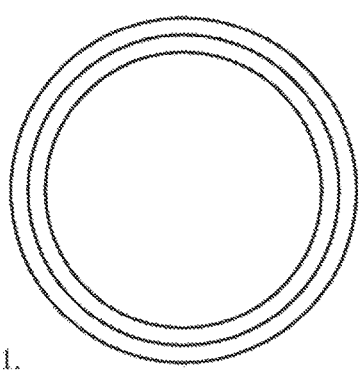
1.
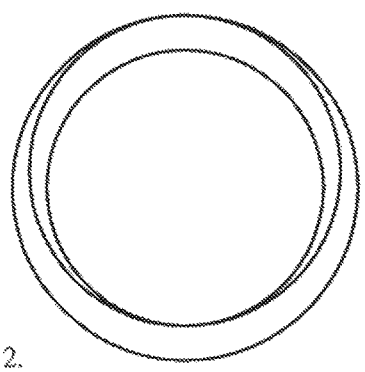
2.
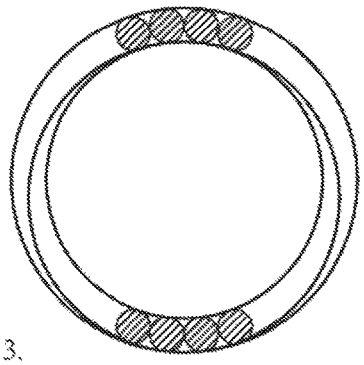
3.
Figure 10
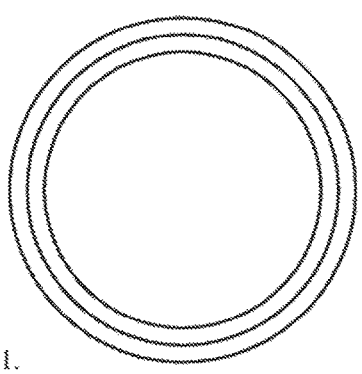
1.
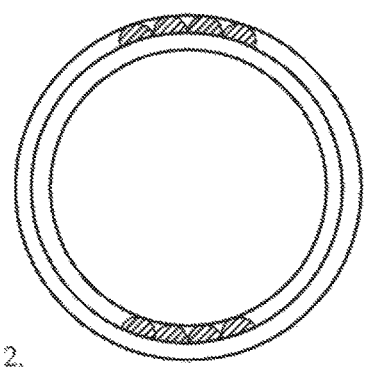
2.
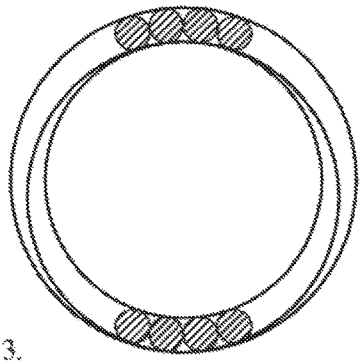
3.

Figure 11
A. 
B. 
C. 
D. 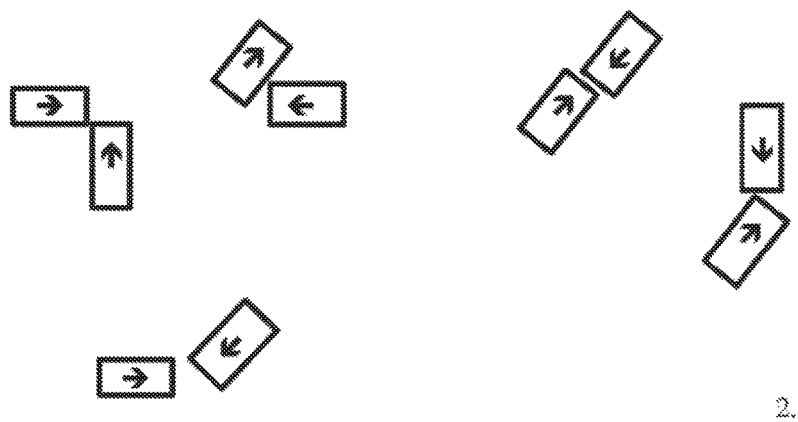
E. 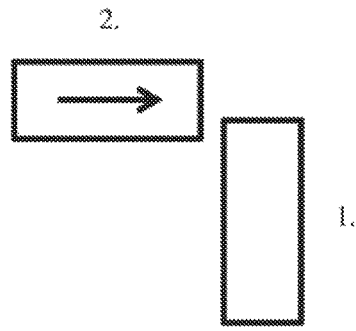
F. 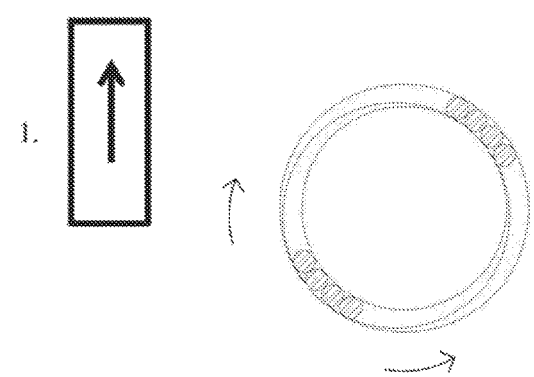

Figure 15
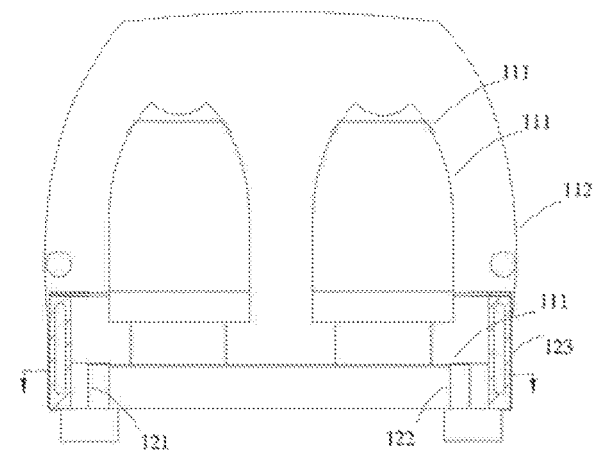
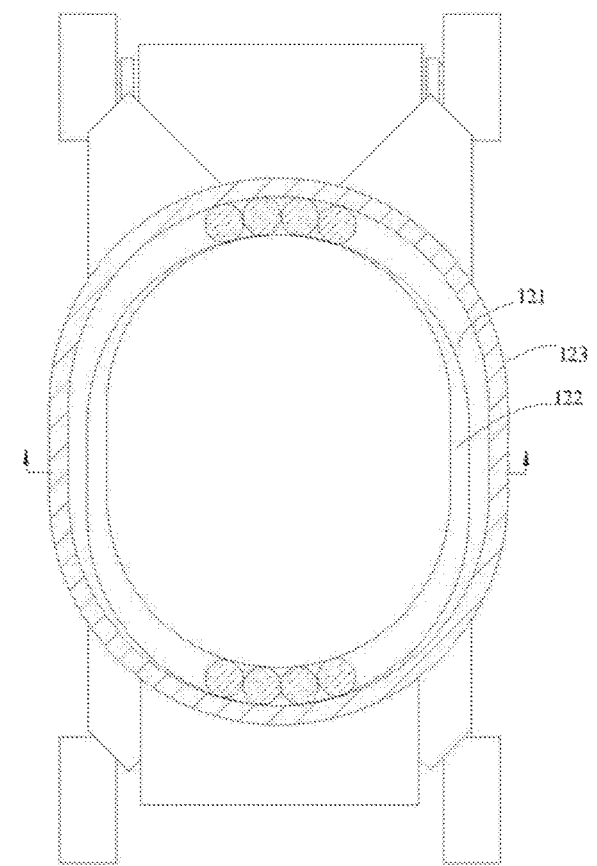

Figure 16

CPS Oscillation Cycle Isolation Control System
Callouts

| | |
|---|---|
| 111. | PM |
| 112. | UPM |
| 118. | Force Transfer Beam |
| 121. | Chamber PM |
| 122. | Chamber UPM |
| 123. | Chassis Chamber UPM |
| 130. | Elastic Element |
| 132. | Elastic Element Storage |
| 140. | UPM Connection |
| 142. | PM Connection |
| 144. | PM Suspension |
| 160. | Explosive Head Bolt |
| 164. | Controller |
| 168. | Sensors |

CENTRIPETAL PHASE SHIFT ISOLATION CONTROL SYSTEM, IN AN OSCILLATION CONFIGURATION OF TRANSPOSITION, DEFLECTION, DAMPEN, DISSIPATION, AND ISOLATION OF A STOCHASTIC VECTOR

CROSS-REFERENCE TO RELATED APPLICATIONS

This application is a continuation-in-part of application Ser. No. 14/091,352, now U.S. Pat. No. 9,114,772, for A CENTRIPETAL PHASE SHIFT ISOLATION CONTROL SYSTEM, IN AN OSCILLATION CONFIGURATION OF TRANSPOSITION, DEFLECTION, DAMPEN, DISSIPATION, AND ISOLATION OF A STOCHASTIC VECTOR, filed on Nov. 27, 2013, which is hereby incorporated by reference in its entirety. This application also claims the benefit of U.S. Provisional Patent Application Ser. No. 62/181,706 for A CENTRIPETAL PHASE SHIFT ISOLATION CONTROL SYSTEM, IN AN OSCILLATION CONFIGURATION OF TRANSPOSITION, DEFLECTION, DAMPEN, DISSIPATION, AND ISOLATION OF A STOCHASTIC VECTOR, filed on Jun. 18, 2015, which is hereby incorporated by reference in its entirety.

BACKGROUND

Upon impact, occupants of a vehicle experience forces tending to cause physiological stress. It is desirable to reduce the physiological stress, thereby reducing trauma and injury.

The automotive safety application of the embodiment addresses immediate concerns of vehicle occupants. The recent increased CAFÉ standards stultify conventional efforts in employing acceptable means of dissipating the transfer of shock during any type of collision. The new standards mandate industry design to minimize available mass, traditionally used for protection and dissipative means. Vehicles must conform to the new 54.5 MPG standard as OEMs realize the sober expectation of more expensive and unsafe vehicles, causing millions to refuse economics of the new car market and its associated increases in death and injury.

Conventionally speaking, the answer to shielding the occupant during a sudden acceleration event is to secure him to a two ton mass, and place a few cushions between him and the mass. This may prevent some from ricocheting off the interior, or going through the windshield. It is commonly understood forces can stress the occupant, in a multitude of directions, to a fractious outcome. Yet, oftentimes, in the presence of a stochastic vector, the occupant is unable to remain secured to receive any substantial form of anticipated protection.

The innovation addresses the management of direct transfer forces and inertia in the event of a vehicle collision, for an ultimate gain of passenger protection. Airbags presently have a strong presence on the stage of passenger protection, whereby a vast set of innovative improvements is employed.

Ideally, a dampen dissipation element, as an airbag is positioned to capture force transmitted by the passenger, expressed as a stroke. A stroke source being the upper torso of the body, pivoting forward at the waist.

It has become obvious to authors of credibility, an airbag is effective in dissipation of energy in result of a long stroke. The airbag requires a long dissipative stroke for effective and meaningful dampen value imparted to the passenger, as expressed in Breed, who furthers an exception, employing a comparatively larger proportion of gas volume and surface tension area employed in force dampen.

Another protection device in acclaim is the belt tensioning mechanism, imparting a passenger position control of the upper torso, rendering potential significant value, especially in the early pre-deployment phase of airbags. Restraining the passenger to a near vertical position during airbag deployment, and release of restraint during the stroke, permitting a dampening of the upper torso range of motion. Of further note, timing requirements in initiating tension values of the device are critical in gleaning benefit of the airbag stroke/dampen characteristics. Which are in strong question of providing benefit if the passenger size or proportion is not within the scaled value of the restraint design. Particularly children, short, large or overweight adults.

These protective elements may comprise an appearance of a strong solution set to the unwary consumer. One may ask, higher magnitude forces occur from any direction. And, if side curtains are an acceptable dampen device, why are they not provided for the frontal direction of force? Or, frontal airbag protection for the side collision? The reason being, none of the solutions is without obvious limitation, nor comprehensive in addressing the full needs of the consumer passenger. Being designed for one direction dissipation, the frontal airbag is limited to that one direction, primarily for collinear forces such as collision with a wall, a mass perpendicular, or head-on, in the direction of travel. Requiring forces to be collinear with the direction of travel. If a vehicle happens to be struck outside the frontal collinear alignment of travel-direction inertia and direct forces, passenger bodies are exposed to risk of much greater traumatic consequence. When a passenger inertia is offset from the collision direct force transfer, a non-controlled passenger deflection with the airbag is likely to occur. And further, as previously stated, the belt tensioning device is signaled to slacken, permitting the passenger to bend forward for a dampen stroke, in compression of the bag and dissipation of force.

This slacking of belt tension promotes lateral movement of the whole body in some cases, or at least the upper torso, depending on the belt mechanism. In both cases, surrendering body control, made especially obvious during a side collision event. But common in events where the body is subjected to more than one direction, as in a body inertia, versus a direct force transfer.

The recent advent of the ceiling air bag may provide speculation in addressing belt tensioning, yet any significant passenger torso movement, providing the opportunity of a dampen stroke, again exposes the body for susceptibility to lateral movement. The larger magnitude events require greater protection capability, for a larger dampen stroke, and with it, greater exposure to larger lateral forces, for an overwhelming loss of force management control. But given a scenario of a passenger remaining anchored to the seat, any lateral deflection dampen dissipation means is limited to the frontal direction, requiring a force of frontal origin.

It's been no secret. The art has remained restricted to the sourcing of dampen and dissipation of passenger body forces, during collision, to the movement of the upper torso. Submarining of the body serves witness of upper torso management myopia. Focusing acceleration forces upon a potentially limited mechanical movement and portion of the body. As dampen dissipation of side lateral forces is obviously not available in the forward movement of the torso, for several reasons. Consideration can be furthered, why isn't there a symmetrically equal, stronger and comprehensive protection available to passengers from forces of any lateral 360 degrees of direction?

A conventional fastening of passengers to the vehicle, in a static, near upright position has been found not to be the answer. In example, by securing their helmets and bodies to the car frame, professional race car drivers submit their bodies to a controlled format. But, to the ultimate consequence of death, in some types of minor appearing direct force collisions, even at low to moderate speed, having no opportunity for force deflection, employing minimal dampen dissipation capability.

Management in distinction of collinear and non-collinear, rotation, or secondary inertia vectors is vacant. No passenger protection of the art currently distinguishes among the above, in managing these events beyond the same solution set, a safety belt and pillow. Requiring subjection of the passenger body to perform in a force transfer dance. Working no management of the stochastic vector, prior to a direct force bombardment of the passenger, from one or more directions with expectations of relief, in a cushion afterthought.

Permitting a short redress of perspective, in a passenger vehicle, the maximum stroke comprising a dissipation travel range, is limited to the movement of the upper torso, which is restricted by the safety belt. As the airbag is the dissipative medium for its protection, the body is restricted by the safety belt, as the purpose of restraint is restricted by the need for dissipation. A format, permitting only solutions of built-in limitation, with purposes in conflict of each other. Identified largely as chasing tail.

Safety force control limitations, followed and held closely by the industry for more than fifty years, secure the passenger body to a nearly two ton mass, committing it to destruction, in exposure to a magnitude of forces foreign to the conceptualization of the passenger, for a decimating consequence. It is hoped the following demonstrations illustrate limitations formed, in 100 year old plus technology, are no longer needed, or acceptable.

The exercise of extensive efforts identifying the position of passengers, for qualifying deployment of airbags, and recognizing the possible negative consequences of airbag contact for a safety belt secured occupant, being out of acceptable positioning, may be an opportunity for the industry to recognize system limitation and potential for an alternative approach.

Even the most aggressive protection designs in occupant restraint systems, provide little or no means for controlled force deflection. Requiring the body and restraint system to assimilate full scale acceleration forces immediately upon impact. The roughly thirty percent who are saved as a result, can be thankful for the present state of technology. Yet, the present and future demands to resolve opportunities for safety are expected to only escalate.

SUMMARY

The innovation controls passenger body inertia of a moving, or static vehicle, during collision with a mass, of any lateral 360 degree directional origin. Committing a protected mass or PM inertia to deceleration, by a transposition or DDD configuration cycle of the PM, or a symbiotic relation of both, transposition and DDD, comprising an oscillation cycle or cycles of forces, in deceleration of the PM, performed concurrently in isolation of an unprotected mass, or UPM. Inertia of only one, or a plurality of directional components, as in a secondary inertia vector or rotation, and the facility to implement deployment of the device, prior to a full vector attribute identification. Plus a vector deceleration by oscillation, extending time history of vector deceleration beyond an initial cycle, are included in the vector deceleration, transposition, DDD and isolation control solution set. An isolation control device is provided in one or more embodiments, and described below with respect to a popular passenger automobile application, yet embodiments are configured for installation in other vehicles, such as civil and military, trains, trucks, busses, watercraft, all-terrain vehicles and aircraft comfort.

BRIEF DESCRIPTION OF THE DRAWINGS

For a better understanding of the nature and objects of some embodiments, reference shall be made to the following detailed description taken in conjunction with the accompanying drawings:

FIG. 2 is a plan view and section of CPS chamber in a 0 degree bearing gait set initiation;

FIG. 5 is a plan view and section of a segmented CPS isolation chamber in-stack, in a 0 degree travel inertia bearing configuration;

FIG. 7 is an illustration of a 64 gait datum by individual gait;

FIG. 8 is an illustration of a 64 gait datum by gait set;

FIG. 9 is in illustration of a full chamber span transposition of the PM;

FIG. 10 is in illustration of a half chamber span transposition of the PM;

FIG. 11 is a set of illustrations in demonstration of vehicle travel inertia;

FIG. 15 is illustration in section and plan view of an embodiment integrated vehicle;

FIG. 16 is illustration of the system callouts.

DEFINITIONS

Figure 1:
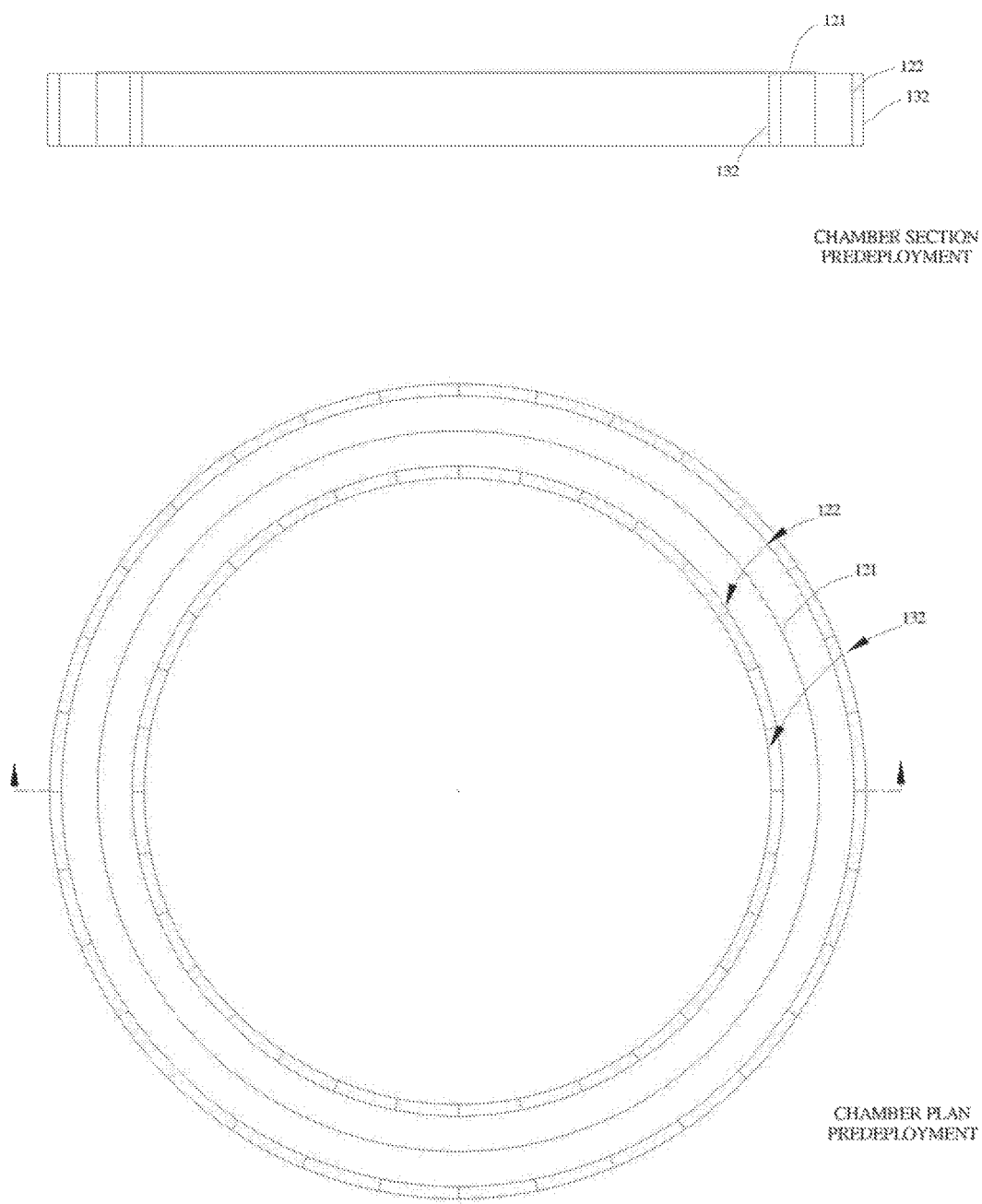
FIG. 1 is a plan view and section of CPS chamber in a concentric pre-deployment state.

"acceleration episode": A given point or duration of time a mass is subject to change by a vector influence.

"angle of incidence": A term denoting the proximity of the PM chamber element to the UPM chamber element, and may be monitored as a contributing indicator of embodiment performance.

"CPS": Acronym of the term Centripetal Phase Shift. A CPS is a centripetal induced phase shift. Specifically here, the transposition of a force vector to a centripetal path of dissipation is performed. Resulting in a phase change, or shift of energy acting upon a selectively isolated configuration in one of two masses, from an original mass.

"chamber span distance": The defining active bounds of the PM 121 chamber, in association with a PM transposition distance or DDD configuration, interior or anterior EE width, defining bounds of an osculatory relation of the PM 121 to UPM 122 chamber elements.

"elastic element": An element rendering physical elastic characteristics, i.e.: elastomers, bimorph, magnetic, piezoelectric or other actuators, singular or in association with materials responsive to signal in changing form or elemental structure for their elastic property, or elastic characteristics caused, in association with other elements, by way of example, a bimorph actuator, MRF, gasses and other hydraulics.

"gait": The term used in identifying the configuration setting of the PM position, path and direction of its dissipation, prepared at initiation of the CPS isolation control system. The gait configuration comprises three elements: location of the point energy is initiated upon the UPM chamber, referred here as the UPM vector transfer, the PM dissipation path and its direction. An intruding vector's UPM point of vector transfer is identified forecast or projected, qualifying the implementation of a gait.

"hydraulic medium": Includes fluids, powders, gasses, not limited to MRF, magnetorheological fluids, ERF, other visco-elastics, foam, hydraulic fluid, and air, serving as force transfer and dissipation agents, contained in a force control, containment or transfer device, as a dampen or absorber system. May contain an inlet and outlet with a valve or regulating function. And may provide a means to preserve pressure within a system, for stabilization and prevention of cavitation, as a reservoir.

"isolation": Isolation is associated here with partial and total disconnect, or disassociation of one mass from another. In this document, the PM, versus the UPM. Dampen is commonly associated as a means of achieving isolation, yet the terms elastic suspension, dissipation, deflection and others, are used here in further describing featured states of energy, occurring upon a mass during an event of energy transfer, or a process to achieve isolation of a mass. The term is commonly recognized as a means to detach, deflect, redirect, dampen, or dissipate undesirable effects of a vector.

"PM": The acronym of the term, 'protected mass', denotes a mass protected from an intruding force vector disturbance. The PM is the isolated mass, separated from effects of the 'unprotected mass', comprised largely of occupants and facilities for occupant seating and restraint anchorage, standing or rest of occupants, optional storage protection of cargo, animals and those force transfer elements of the embodiment designated as such. And may comprise any set of elements designated for protection by design. A 'PM or UPM centered' embodiment is characterized by notation of the minor chamber of chamber sets.

"Point of vector transfer": A point of vector transfer is recognized as a point, comprising a vector at a mass or intersecting masses.

"Secondary inertia vector": An inertia comprising a directional component not of its original bearing origin, introduced following a mass original travel inertia bearing, and may cause rotational adjustment of the mass.

"sensors": Devices used in detection and analysis of an energy, vector, heat, frequency, radar, mass, position, distance, direction, velocity, acceleration, pressure and/or density, for signal transmission to a controller.

"suspension": The suspending of an element. The associated application here is suspension by any one or more stable or unstable pendulums, or combination, suspension plane, combination pendulum and suspension plane, or slide for a free associative state of the PM.

"toroidal": A form composed of toroidal elements.

"transport vehicle": Used in transport of occupants and/or cargo.

"UPM": An acronym of the term 'unprotected mass', any mass unprotected by the embodiment. Typically the vehicle and mass elements the PM is designed to be isolated from.

The following terms may be synonymous or interchangeable in associating a condition or object, related to this document:

chamber/cylinder/rotational element
controller/ECU/electronic control unit/memory
absorber/actuator/bimorph actuator/damper/dampen/elastic element
CPS dampen, deflection and isolation control system/CPS isolation control device/CPS isolation control system/CPS system/Centripetal Phase Shift
inertia/momentum
transposing/transposition/transpositioning/deceleration/decelerate/dampen/dissipation/deflection

DETAILED DESCRIPTION

Provided, in one embodiment, is a centripetal phase shift, or CPS deflection, dampen, dissipation, and isolation control system, comprising a first structure comprising at least one chamber 121; a second structure comprising at least one chamber 122, wherein one or more elastic elements 130, is interposed at the chamber of the second structure 122 and the chamber of the first structure 121, wherein the first structure 121, is moveably attached to the second structure 122, whereby a protected mass or PM 111 inertia vector is transposed, deflected, dampened and dissipated in deceleration and PM 121 is substantially isolated of an unprotected mass or UPM 112.

The present disclosure provides a device, capable in substantially isolating those forces contributing to occupant shock during a sudden acceleration episode. Forces typically experienced in a vehicle, bus or truck collision and acceleration ranges related to occupant safety, comfort and cargo protection in auto, rail, air and water transport vehicles.

Upon initiation of the embodiment, an unprotected or UPM vector transfer occurs where a configuration is qualified and manifests at the two masses PM 111 and UPM 112, and positioned by the embodiment to be non-concentric, in not sharing the same center or datum point. In result of forming a linear relation, offset of the two masses, represented at their respective chambers, 121 and 122.

The PM is directed on a path of isolated dissipation of the PM inertia, in isolation of the UPM vector. Noting the force transfer is isolated, occurring exclusively at the intersection of the two geometries. Delivering an osculatory or tangent association among the chambers 121 and 122.

By way of example, in the case of a vehicle, if one chamber 122 is associated with the frame and body or vehicle chassis, being designated an unprotected mass, or UPM 112. And a corresponding chamber 121 associated with the seats, restraint system and occupant passenger, or otherwise optional designated protected mass, or PM 111, the relation of these elements can be provided as above, for an identical corresponding result.

For further clarity, by way of example, a CPS isolation control system is illustrated in FIGS. 1 and 2, in pre-deployment state and at activation, respectively. The CPS isolation control system serves the protective management of the PM components such as occupants, seats, harnesses and the structural interconnection of the embodiment, versus the UPM components such as body and chassis, which performs the long standing role, as the structural and sacrificial medium.

FIG. 1 illustrates a portion of an example CPS isolation control system in a pre-deployment state. At the bottom, a chamber plan view of chambers within a UPM centered CPS isolation control system is shown, and at the top of FIG. 1, a section view of the chambers of CPS isolation control system.

The CPS isolation control system features a concentric alignment of two mass types, a PM chamber 121 and a UPM chamber 122, represented with a common datum position. PM chamber 121 and UPM chamber 122 provide containment, tension and compression. The section view positions the elastic element storage 132 in a radial, or arc formed orientation, for deployment near the chamber 121 and 122 perimeters.

FIGS. 1, 2, 5, 6A, 12, 13 and 15 are presented for the purpose of illustrating applications of the inventive concept, and not for the purpose of limiting the same, as an embodiment of the CPS isolation control system includes a PM 111, in suspension by PM suspension 144, in connection with force transfer beam 118, in connection with explosive head bolt 160, a PM connection 142, which may be a selective coupling to an unprotected mass, or UPM Chamber 122, being proximally interposed to a suspended PM Chamber 121, having an inner non-concentric, and tangent bearing relation with a set of elastic elements 130, arranged in an inner non-concentric and tangent bearing within a chamber 121 and/or 122, or chamber sets, and 122 being secured by an unprotected mass connection UPM 140 to the unprotected mass, UPM 112. As illustrated by FIGS. 1, 2, 5, 6A, 9, 10, 12, 13 and 15, an embodiment set of chamber elements may comprise a compilation of segmented, or complete simple form, whose sum may, or may not equal a complete basic or organic geometic form.

Figure 3:
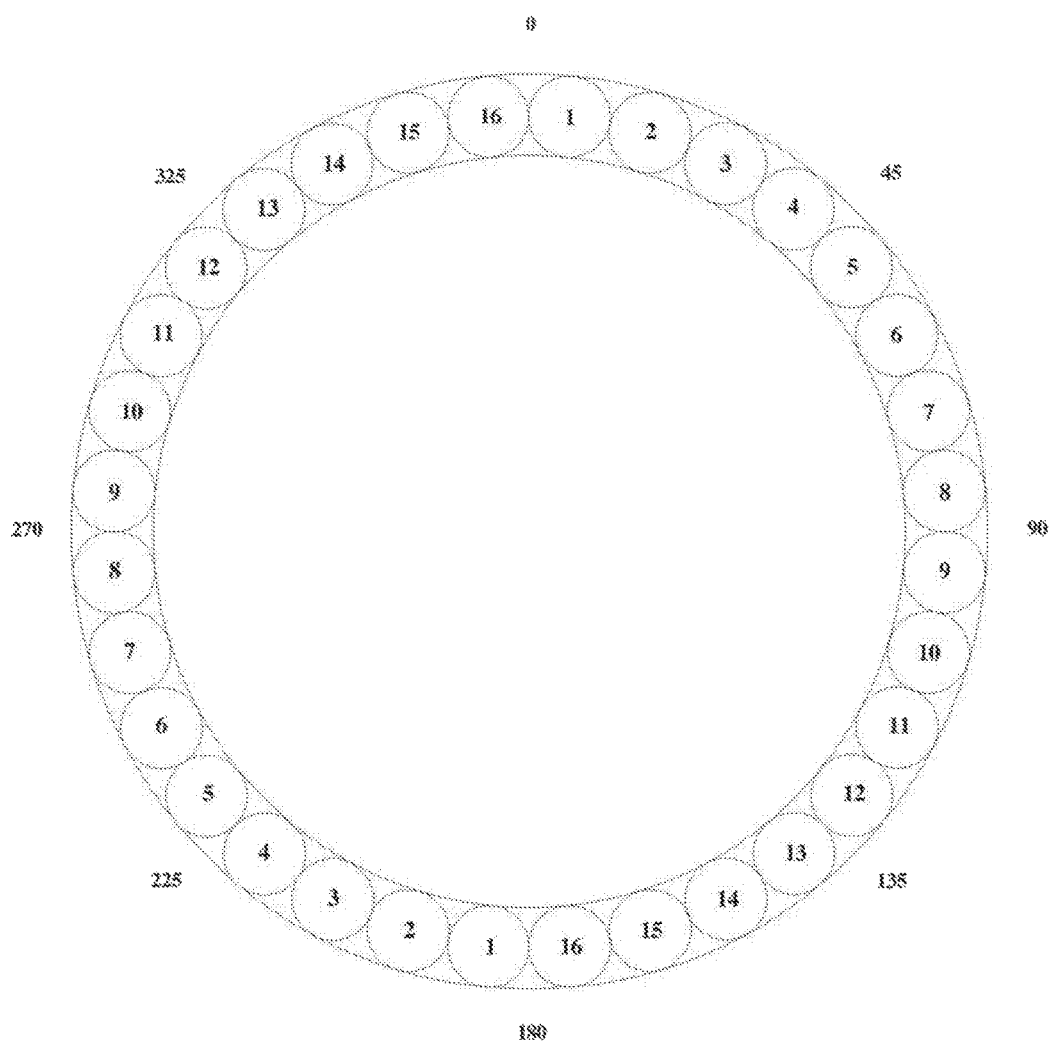
FIG. 3 is a plan view of a 64 gait CPS EE layout.

FIG. 3 is a plan view of a 64 gait CPS chamber configuration in illustration of the elastic elements or EEs comprising the embodiment of FIGS. 1 and 2. The PM chamber 121 is removed for clarity, serving reference to FIG. 7 and FIG. 8.

Figure 6B:
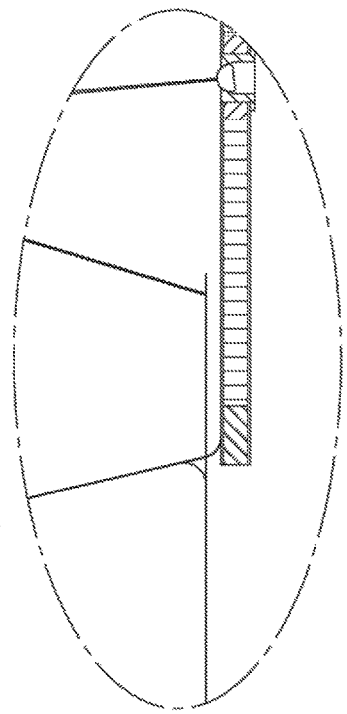
FIG. 6B is a magnified embodiment suspension section view.
Figure 6A:
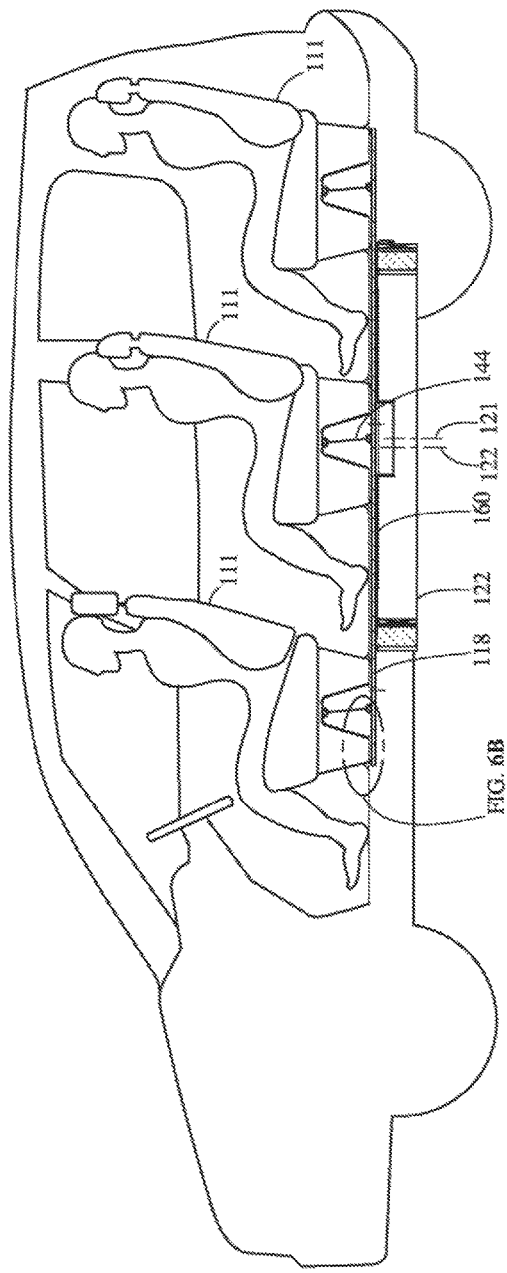
FIG. 6A is aside view of an embodiment application in a vehicle section.

FIG. 6 is example of a CPS isolation control system application within a vehicle, representing elements of the PM with the designation of 111, and PM chamber 121. Again, the UPM elements are generally associated with being connected to structural elements of the application, largely, the body and frame, identified UPM 112, and UPM chamber 122 of the embodiment. PM components are noted to be in suspension, via suspension 144, as the result of the embodiment being currently activated. Illustrating datum of the two chamber elements 121 and 122 being largely non-concentric, or offset, following release of explosive head bolt 160.

FIG. 2 illustrates a UPM centered CPS isolation control system at activation. As illustrated for the embodiment of CPS isolation control system, elastic element(s) 130 are initiated from elastic element storage 132 at activation. The activation of the elastic element(s) 130, displaces datum of the PM chamber 121, for an off-center relation with UPM chamber 122, as illustrated in the chamber plan and section views of FIG. 2.

The device of FIGS. 1 and 2 is a 360 degree 64 EE sequential cell/cycle embodiment. Providing for 64 gaits and 32 points of PM configuration. Dual deflection, dampen and dissipation, or DDD direction available in 11.25 degree increments of the embodiment datum, providing a fine datum in initiating a PM position. For a targeted control of the PM within +/−5.625 degrees accuracy of an inertia bearing, ensuring effective use of dampen resources, regardless of the event angle of incidence. Embodiment EEs are comparatively small in volume, providing a greater surface tension area per liquid volume ratio. A substantial benefit in terms of overall size requirements of the embodiment to the potential dampen, resistance capacity of the device. A smooth DDD is contemplated, as a large circumference chamber contact surface area is employed, availing a diverse range of resistance capability. A 64 EE version performs deployment of EEs laterally, from each side of the PM chamber wall, regardless of the PM position at deployment of the EE. Deployment may also be assigned from above and, or below the chamber, as depicted earlier here. Offering concise and instant positioning of the PM in the chamber without interference or obstruction. EEs may also be deployed laterally from a PM chamber wall of composite, honeycomb or structure of a similitude, comprising cavities or compartments, housing EEs with deployment access directions from each side of the PM chamber wall. EE fluid distribution being provided from upper and, or lower flexible conduits in connection with an EE resistance charging and discharging single source, or separate facilities. The PM chamber wall with integral EEs is not limited to this one embodiment, as it can be featured in any application. As the majority of features in the embodiments are interchangeable with and applicable to each embodiment.

Initiation of the FIGS. 1 and 2 device is implemented as other embodiments. The PM DDD configuration is qualified and plotted in association with the nearest gait increment of the embodiment datum, in reference to the bearing of travel inertia, comprising the vector product of the masses at collision. By way of example, a product of two vehicles at collision is identified, having a travel inertia bearing product of 38 degrees, referencing FIG. 8, a 33.75 degree plot is associated. The PM is plotted at 213.75 degrees, centering the PM alignment between the number 3 and 4 EEs, in 180 degrees opposing sides of the PM chamber 121. The gait will comprise EEs, of a preferred number and bearing, in a sequence and timing, qualified by the ECU demands and capacities of the embodiment. Recognizing the product of the PM, and the UPM travel inertias of both vehicles.

Figure 14:
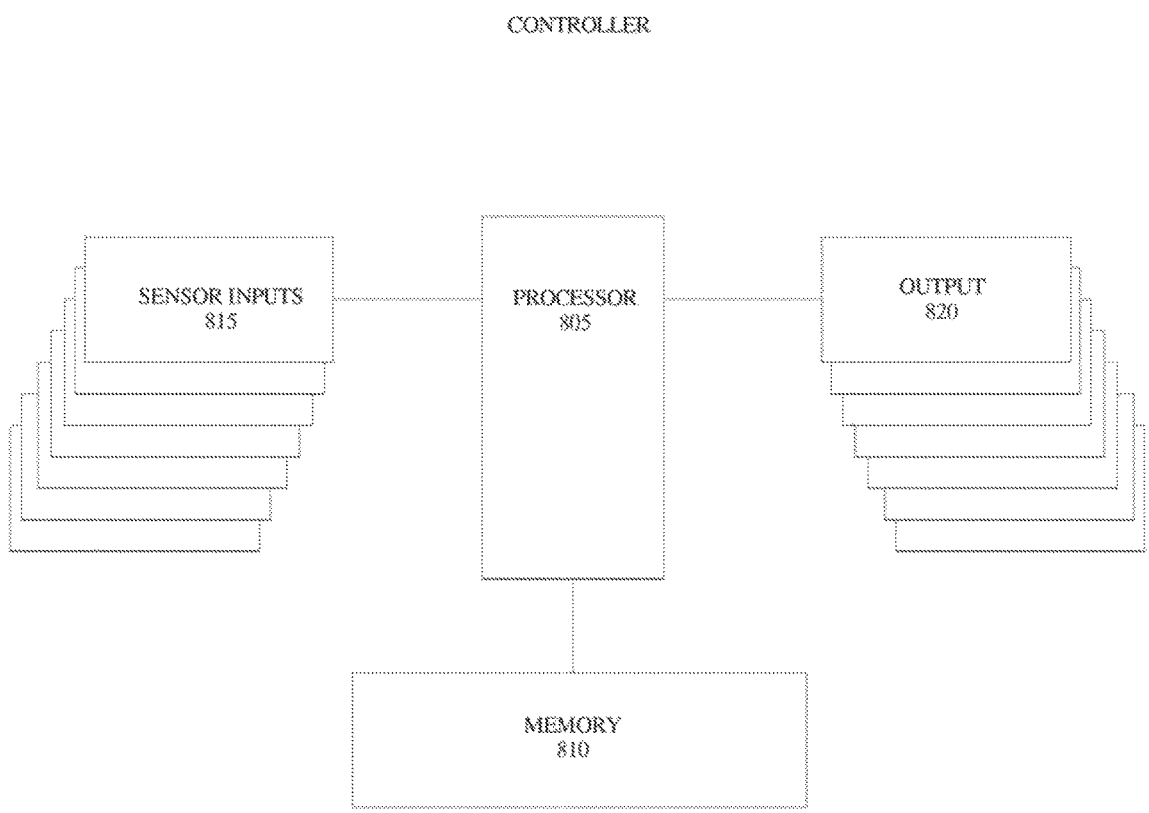
FIG. 14 is an illustration of an ECU or controller.

At activation, PM components are set in suspension and isolated from the UPM. Isolation of the PM components is initiated through the severing of a connection member. By way of example, one or more explosive head bolts 160 is sheared upon receipt of a signal from the ECU. FIG. 14 is example of a controller 800.

FIG. 2 is a plan view of a 64 gait chamber CPS, in illustration of a DDD cycle sequence of a 0 degree travel inertia bearing, and DDD configuration. An illustration of how a CPS may be used in the transposition of a stochastic vector. Information regarding direction, position, speed, and mass characteristics, acceleration, and progression associated with an intruding force vector are identified concurrently with the PM and UPM characteristics. And further signaled by the sensors 168, for processing and determination by the ECU, electronic control unit 800, for activation of the CPS isolation control system. Upon activation, the PM is released from the UPM, in suspended state, thereby establishing isolation of the masses. By way of example, explosive head bolt 160 may be initiated to sever connection of the PM and the UPM. Following isolation, one or more elastic elements 130 is initiated, interposing a path constructed of resistance disposing the PM chamber in configuration, intersecting a point tangent with a UPM chamber, as directed by the ECU 800, for the given direction, location, speed, rate of acceleration, magnitude and attitudes of the vector. The PM is, as are all components of the vehicle, subject to forces of acceleration from the direction of a vector, yet the PM is the exclusive recipient of the dampen suspension and isolative properties rendered by the embodiment.

Figure 4:
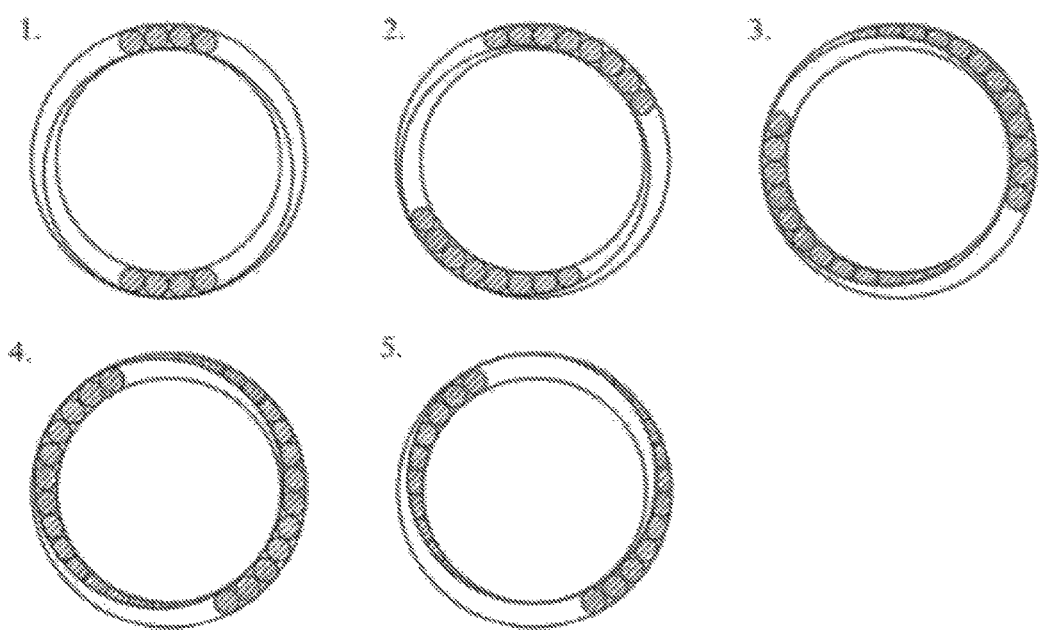
FIG. 4 is a plan view of a 64 gait CPS DDD cycle sequence.

In further consideration, a PM inertia vector is disposed to travel opposing a linear vector, prior to any interference. Yet, upon vector transfer, an embodiment configuration, comprised of a set of chamber and elastic elements may be provided through an alignment of form and resistance, for directing a vector transfer to a preferred dissipation path. Referring to FIG. 4, a vector path may be provided in alignment of compression and resistance of elastic element(s) initiated in a chamber, providing near equal distribution of forces. The configuration provides for an immediate tangent relation of the chambers at initiation of the system, following through vector transfer to final dissipation. The configuration of form and resistance supports minimal disturbance of the chambers, as their alignment is isolated of dissonant forces while direction is committed to the vector influence.

PM inertia, provides tangent travel of the PM chamber within the UPM chamber, while compression of the EEs resists force transfer, offering a selected magnitude, and modulated articulation featured dampening of the PM in an established path.

As shown in 4.2-4.5 of FIG. 4, the PM continues its clockwise path, as the EEs 130 provide the ECU 800 specified value of vector deflection, dampen, dissipation and isolation properties. Feedback monitoring of the EEs by signal may be provided by contact, pressure, heat, laser, lidar or other sensor or combinations. An active aperture control facility may be used in signal of ECU with sensor data, at initiation of the EEs, and for the purpose of timing modulation and resistance value of dampening, and isolation properties, relative to the isolation status of the PM. Alternative dissipation control of the art may be used, by way of example, weakened containment element, tears, 1 way valve arrangements, variable fluid direction aperture control, heat responsive, passive or active piezoelectric and bimorph actuated resistance control as supplement, hybrid or stand-alone sources of dampening control.

Furthering consideration, a phase change or shift of energy frequency, amplitude or time may exist in each, or in the relation of two masses. A selectively isolated configuration of a mass from an original mass is provided. And upon vector transfer, the transposition of a force vector to a centripetal path of dissipation is performed. Resulting in a phase change, or shift of energy acting upon the configuration.

The CPS isolation control system and method further comprises, providing signal communication of the controller to the actuators, elastic elements or valves associated with the determined gait. Causing the elastic elements or EEs to be armed in the prescribed resistance value(s), based on the sequence timing(s), dissipation rate(s), processed and stored data, accessed by the ECU. Thus, the PM is positioned for vector influence. And upon vector transfer, immediate initiation of a vector transposition manifests through a rotary transmission, transposing the linear stochastic vector to a contained dissipative format, managing the direction, path, dampen and dissipation rate of the PM, in isolation of the UPM. The reader will note, the nature of the transposition discussed here is the change of a linear to a centripetal direction, recognizing distinction of transpositions performed in the embodiment. Here and in following.

FIG. 5 is in illustration of plan and section of the FIG. 1, 2, CPS isolation chamber, in segmented version, provided in-stack. And, DDD configured for a 0 degree travel inertia bearing. Providing a larger radius and characteristics, within a much smaller footprint. Noting force transfer beam 118 is removed from plan view for clarity. Illustrated in-stack, placement is possible in one location, for a monolithic embodiment, or a plurality of segmentations distributed to a plurality of vehicle locations, as may any full or partial radial form, or number of segments comprising a 360 degree datum of an embodiment.

FIG. 7 and FIG. 8 are gait configuration data of the 64 gaits comprising a centripetal phase shift, CPS Isolation Control System. FIG. 3 provides reference to the position of EEs at the embodiment datum. An individual gait relation to an individual EE is identified and associated in FIG. 7, in relation to an inertia bearing, of an identified travel inertia, provided by the ECU. FIG. 7, illustrating the 11.25 degree range of each individual gait EE by the direction of DDD or deceleration. By way of example, a travel inertia bearing of 326 degrees, plots a PM at 146.25 degrees, in gait 14 and EE 14, for a counterclockwise direction. The range of a DDD is provided in 326.25-315 degrees, and available in the clockwise direction of gait 13, for a 315-326.5 range of DDD.

FIG. 8 provides the 64 gait datum of gait sets, associating a given travel inertia bearing with a PM position at initiation of the system, the gait set identifier, and the EE set associated with the gait. Gait sets, comprising a 180 degree DDD of the plotted PM position are identified by DDD direction, in two further columns. Plotting or configuration of the PM for a DDD is straightforward. By way of example, an inertia bearing may be identified as 80 degrees. The nearest inertia bearing plotting is 78.75 degrees, whereby the PM is configured by the set of EEs of gate set 8', being 6,7,8, and 9, positioning the PM DDD to initiate at 258.75. Bearing in mind, a plotting of the PM may be biased, by arrangement of priority recognized by the system, for its effective use in providing passenger safety, for a present set of conditions.

FIGS. 1 and 2, each contain a full minor and major, interior and anterior volume of 180 degrees, in approximately 360 degrees of DDD from the configuration set, by result of a 180 degree PM DDD configuration traveled by the PM. Anti-friction or AF coatings, particularly a Molykote 3402/CLF, similar or better are intended for lubrication of the EE materials, especially in surface contact of a repositioning chamber wall during course of EE deformation.

Figure 12:
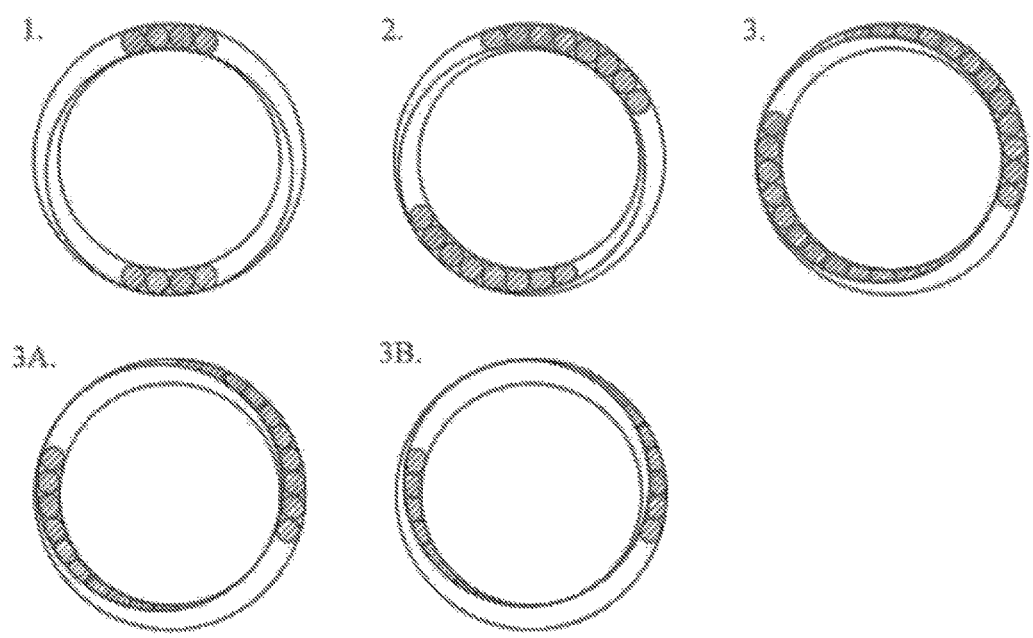
FIG. 12 is an illustration of a plan view sequence of the 64 gait CPS system, in 0 degree travel inertia bearing configuration, featured in a transposition and DDD oscillation cycle.

A further DDD cycling of the embodiments is available, rendering an extended travel path and DDD time history, beyond the maximum 180 degree travel arc of the PM. Being a DDD cycle has not fully dissipated the PM inertia or UPM influence, by preference or otherwise, the PM travels an extended path, in opposition to the PM inertia direction, during its transposition to a new DDD cycle configuration. Transposing the PM to a new gait formation of EEs. The transposition is performed by re-initiation of the original, alternate or combination of EEs, in whole or part. Positioning the PM for performance of a DDD phase of oscillation cyclicity in the chamber. By way of example FIG. 4 illustrates a DDD of a frontal PM inertia direction. A DDD is executed of the embodiment chambers of approximately 360 degrees. Or, as illustrated in FIG. 12, a DDD is performed to a preferred cycle stage, to less than a full initiation set shown in FIG. 4. A new, or re-configuration of EEs, or gait is initiated, for transposing of the PM to a new or refreshed DDD cycle.

Figure 13:
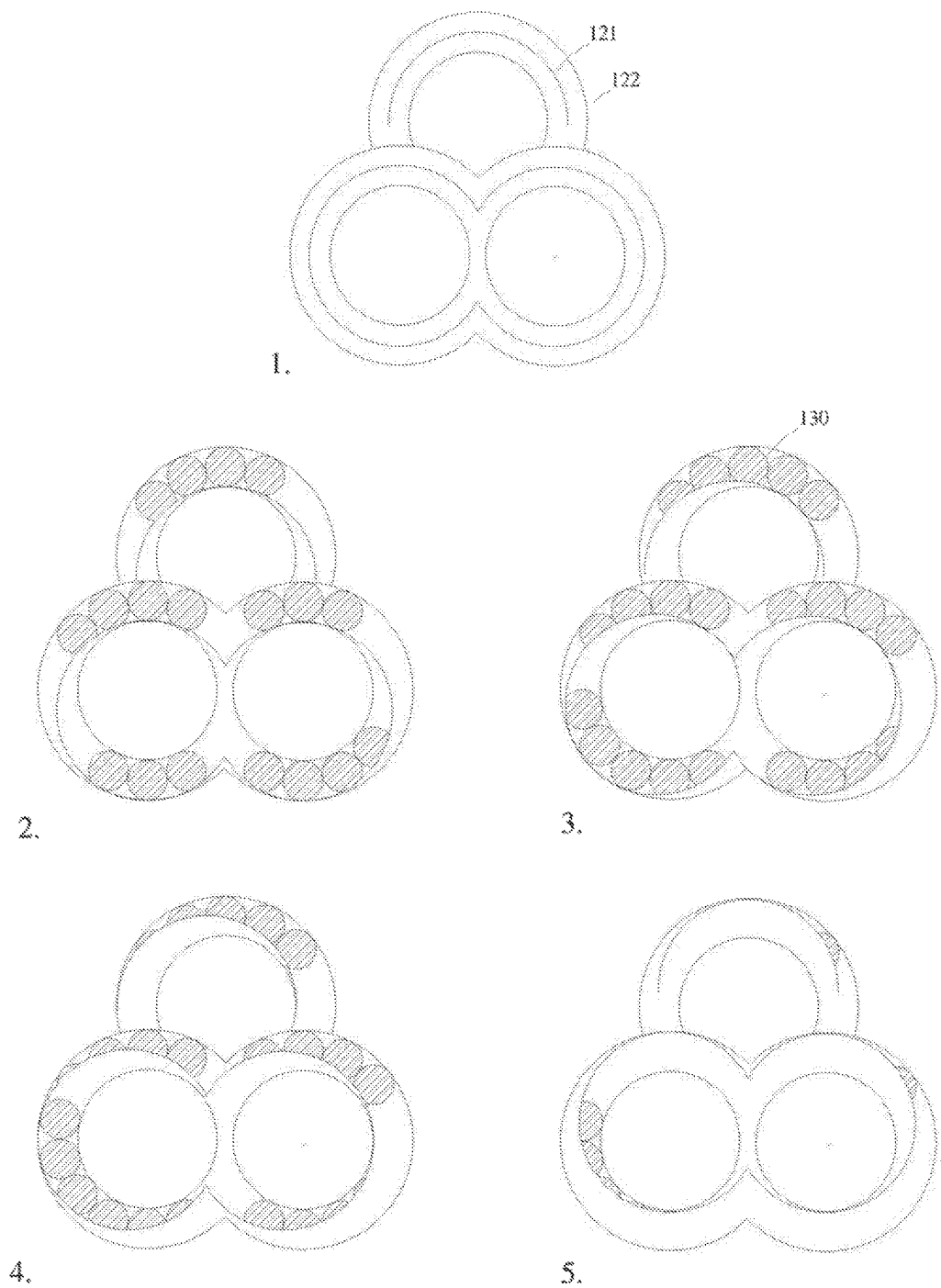
FIG. 13 is a plan view sequence of a trinity chambered transposition DDD oscillation cycle.

FIG. 13 illustrates a cycling, from 1 to 3B, providing opportunity of returning to 1, 2, 3 or other positioning of the PM for a DDD performance of the chamber, as may be performed in FIG. 4. Noting, FIG. 13 provides for greater proportional exhaustion of EE charge, prior to a transposition. Transpositioning of the PM is furthered in following paragraphs.

FIG. 4 and FIG. 13 illustrate sense, for the permutations available, in use of the 360 degree range and dual direction capabilities, in transposing and DDD cycling of the PM, by the embodiment. In an embodiment provided with no aperture control of the EEs by signal, reinitiation of the EE, in some EE designs may not be feasible. Yet, initiation of an alternate EE set is available in the 64 EE option. By way of example, when a first set of EEs is used in a 180 degree travel of the PM, for a 360 degree embodiment DDD, an alternate EE set is available for initiation, in an opposing direction.

Chamber pressures of the EEs may be adjusted at any point throughout the DDD cycle, qualified in part by force activity upon the PM subjected to the passengers, as the passengers, PM and UPM are signal sensor monitored. Furthering control of a dissipation cycle intensity, resulting in longer DDD cycle history and minimization of PM or occupant stress. By way of example, a set of EE charges may be performed, including early preparatory stages of a PM DDD configuration of EEs, or a gait, in opposition of the inertia directional influence. Notably, as the PM approaches, to traverse a point of vector transfer, or travel inertia bearing comprising the product of the collision masses, near the end of a DDD cyclicity.

An isolated PM, performs a DDD on a path configured to reverse course, or traverse a vector bearing, comprising a travel inertia product of intersecting masses, and may be directed to enter a vector influence reference at opposition of inertia performed in DDD of the PM. Comprising an inverse directional relation of the PM to inertia, resulting in a braking of the PM speed, as it travels in opposition of a remaining inertia vector influence, by a distribution of EE resistance. Positioning the PM for a consecutive DDD cycling of the embodiment. Reinitiating a DDD gait, or set, during the course of a DDD. Transposing the PM once again to the original position. Or, initiating an alternate DDD gait configuration. Positioning of the PM from or near the inertia vector bearing is not required, in transposing, as the reader may recognize, nearly 180 degrees is available for discourse in transposition of the PM to a new DDD cycle, in either DDD direction. Yet, a greater deceleration is accomplished in transposing the PM in direct force, and in the PM DDD, by providing a greater braking distance. By way of example, the transposing of the PM near the travel inertia bearing, as seen in FIG. 4, FIG. 9, FIG. 10, FIG. 12 and FIG. 13, positions the PM, a near 180 degree dissipation cycle, and PM in full chamber span distance in deceleration and opposition of the travel inertia bearing.

And furthering, upon initiation of the device, explosive-head bolt 160 may be initiated prior to an EE charge signal at the chambers, releasing the PM from the UPM. Permitting the PM, a free associative movement, by direction of inertia prior to an EE charge, to a point near tangent of the UPM chamber, indicating alignment with an inertia bearing. By way of example, FIG. 9 illustrates, a vector V20 influence, during a full chamber span transposition. At 9.1 the chambers are concentric, prior to a signal induced severing of the PM from the UPM, rendered in 9.2, by the immediate association of the PM to the UPM chamber, in the direction represented by V21, by result of the PM exposure of inertia, during an anticipated single digit millisecond or modified period, in initiation of the EEs. In furthering, FIG. 9.3 has V22 illustrating the vector orientation, wherein the PM is vectored in opposition of forward travel inertia, in deceleration of its influence. By way of a further example, FIG. 13.5 illustrates a configuration of the chambers at the completion of a DDD cycle, for initiation of a sequential gait. And likewise, illustrates positioning of the chambers immediately following release of the PM from the UPM, at initiation of the system. The PM near tangent the UPM at 0 degrees, in result of the point being the strongest association of inertia to the PM, in this example, being collinear and proximal the vector bearing of 0 degrees. In the brief milliseconds, or earlier, the PM is accelerated, prior to a transposition of the PM at initiation of the gait configuration, provided in FIG. 13.2. In this configuration, as in FIG. 9, the PM is transposed a full chamber span distance, in opposition of the inertia influence direction, decelerating the PM immediately prior to a sequential DDD. Where the PM is decelerated in the opposite direction. The dual directions of the PM in deceleration, comprising an oscillation cycle. As referred to earlier, an oscillation cycle is repeatable by one EE, any set or plurality of EE sets, gait or gaits configuring the PM in deceleration of an inertia bearing. A full chamber span, comprises the distance between two UPM 122 chamber walls, defining active bounds of the PM 121 chamber, in association with a PM transposition distance, and interior or anterior EE width.

Alternatively, an explosive-head bolt 160 may be initiated concurrently with, or following an EE initiation charge signal at the chambers. Timing initiation of the EE or EEs prior to signal of explosive-head bolt 160, may include pre-charging EEs, anticipating configuration of the PM for isolation of inertia influence at release from the UPM, by explosive-head bolt 160. FIG. 10 is in illustration of a V20 directional influence during a transposition. By way of example, in FIG. 10.1 the chambers are illustrated in concentricity, as in 9.2, yet the EEs are initiated in timing of the chambers release, illustrated in 10.3 by V22 Deceleration, in transposition, is substantially reduced versus the above and FIG. 9, given the contrasting PM acceleration distances performed in opposition of the travel inertia bearing. Performing an approximate half span distance, in transposition of the PM at the chamber, prior to a sequential DDD. FIGS. 9 and 10 purposely illustrate deceleration at a first initiation stage, where the severing of the PM to the UPM is included. FIG. 10 half chamber span, transposing for deceleration is performed, during an initial initiation of the system. In subsequent transpositions, the PM is directed as rendered in FIGS. 9.2 and 9.3, by V21 and V22, Performance continues, as any typical oscillation cycle in deceleration and isolation of the PM, as referred above and elsewhere in discussion.

In transposition, the PM is configured to an acceleration rate less than the embodiment vehicle, prior to initiating dissipation, as the PM is transposed to a new DDD configuration. Alternately stated, upon acceleration of the PM in opposition of the PM travel inertia, the PM or passenger rate of deceleration is greater than the vehicle. Demonstrated by documentation of Motozawa US657894 and Tsuruta U.S. Pat. No. 6,398,292 with similar references. And, Zimmerman U.S. Pat. No. 8,442,726 employing latter staging of deceleration. Their methods differing, yet recognizing value in reduction of vehicle occupant inertia acceleration, or momentum, relative to the vehicle, and foreshortened dissipation demand, as a product of the process.

Unlike the references above, the opportunity for deceleration is not restricted to the process of events provided in Zimmerman, Motozawa and Tsuruta. In this inventive departure, the PM is provided DDD cycling of its travel inertia, while in isolation of UPM forces. In addition to deceleration of the PM at each initiation, re-initiation, or intermediate point of DDD implementation, in transposing of the PM at a DDD gait configuration, or any stage of DDD, by the embodiment. The PM being decelerated potentially at spontaneity, prior to, during and subsequent a DDD configuration of deceleration, given proper execution at the chamber.

In an alternate phrase, a dissipation and reverse direction acceleration upon a PM is implemented by the relation of EEs, in deceleration and dissipation of a PM. By implementing a controlled direction of direct force, in opposition of an inertia acceleration direction. And, a controlled direction of an inertia to dissipation, in an opposing direction. Hereby, the setting for an oscillating performance is provided for in the chamber. Graphically represented, especially in FIG. 4, FIG. 12 and FIG. 13, by a frequency, per each transposition of the PM to a dissipation cycle provided in the embodiment. An oscillation cycle may comprise a period an EE, or set, is in displacement, or transpositioning of a PM. Plus, the period an EE, or set is in DDD of a PM vector influence. And likewise, a cycle may be identified as a full DDD configuration of a prescribed set of EEs, in a transposition of the PM to 180 degrees from the previous dissipation cycle, for a DDD reload of either DDD direction. Variation is found in the scale of magnitude chosen, for the oscillation required, in fitting a specific setting for a management of forces.

Transposing of the PM, from the above may be performed at initiation of the DDD, or gait configuration, comprising the EEs. Positioning the PM in alignment and opposition of the PM travel inertia bearing. Decelerating the PM, relative to the travel inertia. Immediately followed by the PM in deceleration effects of a DDD. Yet, a transposition, or DDD may be performed at any chosen configuration of the PM, following a signaled initiation, severing the PM from the UPM. Recognizing performance of an efficient transposition or DDD may be commonly performed in the chamber, unobscured by EEs of partial charged states, yet strategic coordination of EE charge and deceleration will facilitate efficient vector management.

An oscillation cycle may comprise any set of sequences provided by resistance orchestration of a device to deceleration of the PM inertia. The order length, sequence, timing or ordered association of vector and embodiment attributes are not confined to definition here. As any gait or EE may be configured to full or partial charge in configured alliance with any other EE, gait, set or sets in the chamber, serving deceleration and isolation of the PM.

And, furthering, a PM in acceleration of travel inertia is subject to opposing forces, in symbiotic relation at the embodiment chamber, upon initiation and re-initiation of a gait DDD configuration, in-part, or whole, wherein:

a direct force is applied by one, or a plurality of EEs, in a direction configured in opposition of travel inertia, transposing the PM, in deceleration of a PM travel inertia vector, whereby the PM travels opposite of an inertia vector influence direction, and a DDD of a PM inertia is performed on a path in resistance presence of one, or a plurality of EEs, in deceleration of a PM travel inertia vector.

Discussion has been limited to the embodiment most effectively isolating forces of only one vector directional component, including the presence of an opposing vector, in collinearity with the travel direction, thereby the vehicle travel inertia. Where two masses share an alignment of travel inertia, a co linearity exists among the vectors. To further explanation, by way of example, in the event of a collision of masses, in a same or opposing direction, a vehicle direct force transfer relation may be collinear, as illustrated in FIG. 11 A, a collinear alignment of travel is shared in two masses of different speed. In FIG. 11 B, an event of one mass without active travel inertia direction, as in a stopped vehicle. And C, where the direct force vectors and travel inertia are aligned in opposition. FIG. 11 D illustrates collision episodes of forward non-collinear travel inertia. Noting, vector transfer contributes adjustment of the mass and inertia directions into rotation, for a complex setting of vector management, in efforts of establishing isolation and vector control. Inertia in non-collinear alignment with its original direction of travel, or in rotational adjustment, are recognized and denoted here, as a secondary inertia vector.

The presence of a secondary inertia event drives further consideration of vector management. Initiating properties of the embodiment requires further consideration of a gait configuration, following a preliminary signal of a potential collision with a static or moving mass.

A gait, or deflection dampen dissipation or DDD configuration of the embodiment is qualified, by the bearing and product of travel inertia upon a point of vector transfer. FIG. 7 and FIG. 8 contain gait datum tables or rendering of gait positions, providing associative reference in identifying a DDD gait, in terms of vector bearing, plus the DDD direction associated with gaits, in expression of two provided embodiments.

And furthering consideration, by way of example, in the event of two vehicles at collision, an embodiment vehicle isolation control system, in signal with the ECU, identifies a point of vector transfer of the embodiment, in projected and real time, comprising the bearing relation, direction and magnitude of a travel inertia vector product, of both vehicles, and the PM mass. Qualifying a gait DDD configuration and direction.

A disconnection of the PM to the UPM is signaled at a qualifying vector transfer magnitude of the UPM.

The gait configuration of elastic elements, or EEs is charged, depositing the PM chamber, in opposition of the inertia direction at or, near tangency with the UPM chamber, configuring the PM offset the UPM, during exposure of inertia. Dedicating the PM to a DDD configured path in isolation of the UPM.

A DDD direction of PM inertia is determined by the bearing and direction of inertia present, and forecast as a result of vector transfer. The inertia directional component may comprise only the original PM travel direction, or one, or a plurality of secondary inertia components, in adjustment of the original travel inertia vector. The proper identification of inertia direction and bearing is exercised in associating a proper embodiment gait, and executing an embodiment DDD path and direction. The issue of a clockwise or counterclockwise DDD direction may determine if a satisfactory DDD of PM inertia is identified and executed. By way of example, illustrated in FIG. 11 E are intersecting masses of vehicles 1 and 2, where 2 is in high velocity collision with the at-stop embodiment Vehicle 1, of a 270 degree inertia bearing. A point of vector transfer, or collinear association of forces support consideration of directing the deployment of Gait Set 9 of FIG. 8. Rather, the relation of the embodiment vehicle inertia bearing to the intruding mass travel inertia and center of gravity or COG is identified by the ECU, concluding the prediction of a clockwise rotational influence upon the embodiment vehicle. As the bearing of travel inertia is non collinear with the point of vector transfer and the embodiment datum. Furthering, a counterclockwise DDD of PM inertia is prescribed, in direct opposition of the direct force transfer rotational influence, as required for an immediate DDD execution of PM inertia deceleration through the embodiment, deploying Gait 1B. And in FIG. 8, Gait Set 9, in CC direction, is identified by association of the travel inertia bearing relative to the embodiment vehicle and the required DDD direction.

In further related observation, the bearing of an intruding mass upon a point may comprise a multiple of degrees. By way of example, the center point of an automobile bumper, may intersect the same corner point of a rectangular mass in any of 90 degrees. Or the same mass corner point is subject to 270 degrees of anterior exposure. Recognizing, the identification of both, the embodiment, and the intruding mass travel inertia bearing are required, in accurate determination of a vector consequence, in vector management.

An accurate determination of the secondary inertia vector bearing is forecast prior to a vector transfer adjustment, or rotation, for effective vector management. This may be considered potentially improbable in some cases. As one of a multitude of physical values may contribute to cause of inaccuracy, in identifying the product of inertia bearing, direction or magnitude, upon a point of vector transfer, in one or more vehicles of a collision event.

The inventive departure comprises an embodiment with provision to address vector transfer, using the forecast and real product of the inertia vectors present, prior and during the event, in configuration with a proper embodiment gait, directing the PM at vector transfer. Prior and during episode, an intersecting mass properties are properly identified by lidar and other sensors for ECU library reference and processing, as a specific model vehicle with a number of passengers and exhaustive physics characteristics, comprising a present linear relation of vectors and mass, center of gravity and measured vector attitudes, positions, velocities, direction, acceleration rates, surrounding geographical and physical features of the embodiment vehicle, intersecting mass and physical environment. Yet, an angle of intersection may be modified, in result of an open variable, as in a frictional coefficient, by cause of weather, a hidden vehicle modification, an improbable interference of the environment, an inconsistent structural integrity of the masses in result of an acute angle of intersection, or other non-predictable consequence at the setting of force transfer. Further, considering the wheel of a parked car, in a collision path being anchored to a curb, or a down sloping and questionable slick, wet and oily pavement surface. Thus, rendering an inaccuracy, or complexity in defining and predicting result of vector transfer, and the collision, outside the sterility of contained lab conditions. It's within the scope of the solution concept to include, or make available, the delivery of competent isolation in scenarios outside constraints of collinear alignments of force, prior to and during a vector transfer, acting upon the vehicle. And further include a solution set in scenarios with inconclusive, or lack of data, prior to a required initiation of the embodiment.

By way of example, illustrated in FIG. 11 F, are two vehicles entering collision. Vehicle 1 is in a forward travel direction represented by a forward vector arrow indicator, in recognition of an imminent vehicle collision of non-collinear inertia travel. Vehicle 2 is on a collision path at 90 degrees of Vehicle 1, their mass and speed being approximately equal. The embodiment PM of Vehicle 1 is configured to a bearing adjusted secondary inertia provided by the ECU, in an approximation, regardless of the cause, plotting alignment of the PM to 225 degrees, and initiating a gait configuration of the PM, comprising the EE set illustrated in FIG. 8. The collision produces one of the following results at the chambers of Vehicle 1, illustrated in the gait configuration provided in FIG. 11 F. When an inertia vector directional influence of Vehicle 1, upon the PM, is greater than Vehicle 2, a clockwise DDD of the PM inertia is initiated at the chambers of Vehicle1. Or, when an inertia vector directional influence of Vehicle 1 upon the PM, is less than Vehicle 2, a counterclockwise DDD of the PM secondary inertia is initiated at the chambers of Vehicle 1, in this configuration event.

The configuration results in the product of travel inertias defining direction of the PM, and its DDD to a secondary inertia bearing-adjusted point of vector transfer. Targeting the PM, by the greater magnitude vector exposure, in result of its presence at the onset of DDD. Initiating acceleration of the PM to travel the DDD direction, proximal the secondary inertia bearing, unknown prior to PM initiation, regardless of reason, for a lack of data.

Discussion may be furthered, as FIG. 8 is illustrated of Gait Set 5, clockwise and counter-clockwise. As illustrated in the PM is positioned in a gait set, for an equidistant DDD path available in each direction, and a supposed equal exposure, proximal to inertia directional elements of opposing DDD direction. Whereby the origin of the directional force or proximity is defined, delivering the PM to a DDD path, in isolation of the UPM. Traveling an arc path of force deflection, in a control format of an ECU concurrently defined set of dampen/dissipation resistance rates. Recognizing a DDD direction is defaulted to the stronger inertia vector directional influence, proximal the PM.

A positioning or plotting of the PM may be performed to influence direction of a DDD travel, as can a manipulation of forces at the chamber through the EEs, or a combination of vector management capabilities. Further recognizing, plotting of the PM may be biased for a condition or scenario of one or a given set of attributes. By way of example, a preferred DDD direction may qualify a bias plot. And further, by way of example, the monitored condition of the PM, plus the scale, physics and physical environment of an acceleration event are factors of an individual application. Open variables in vector management, requiring a prioritized determination be made, in obligation of a DDD direction, by further identifying and qualifying priority or preference of a DDD direction, affecting an embodiment vehicle center of gravity or rotation. At physical rotation, in result of a qualified magnitude vector transfer, the UPM may be forecasted for severe deceleration. A vector management choice may include biasing the plot of a PM, ensuring initiation of a preferred DDD direction is performed in opposition of the forecasted vehicle rotational direction. The above is applied in execution of the embodiment in a variety of environments and event novelty, accessing data of the event. By way of example, as illustrated in FIG. 11 E and FIG. 11 F, the presence of rotation may render an embodiment vehicle out of control. Directing PM inertia in a DDD direction may serve to counter or prevent entry to physical rotation of the vehicle, by its distribution of mass or force, averting loss of control. By active articulation of the ECU, instruction of the PM inertia to a specified DDD direction is performed, as a prevention measure of the vehicle from entering physical rotation, or its minimization, and assurance in accessing an early inertia acceleration or escalation period, for a smooth ride down of forces. Prior to or during rotation, a yaw dampen dissipation force is configured for a DDD direction in opposition of the embodiment vehicle rotation. Minimizing contribution of PM inertia force, in support of the physical vehicle rotation direction, as the PM is in isolation of the UPM, in opposition of the embodiment vehicle rotation. For entry to an early escalated PM inertia deceleration rate and contribution to a deceleration of UPM rotational force. Including, possible deviation of the vehicle from its original travel inertia bearing. Noting further, embodiments vary in the number of gaits, whereby an alacrity in execution of a PM DDD position and direction is made available by choice of positions to execute direction and full 180 degree DDD oscillation cycling. And furthering, by way of example. A preferred DDD direction is not foreseen in management of a collinear travel inertia event, as no directional component is included in the event. Or, no preferred DDD direction is specified by the ECU, in the event of a secondary inertia vector being present, as the added directional component does not qualify the implementation of a DDD direction by bias, but rather no bias is implemented, as illustrated in 11 F. The transfer of forces during the event, determining a DDD direction. And, in event of a forecast rotation of the embodiment, mechanical, or other qualifying condition, a preferred DDD direction is specified by the ECU. Biasing the identification and implementation of a gait, for a PM plot position proximal the vector bearing of the preferred direction. Or, configuring EE resistance values at the PM, influencing a PM DDD direction. Or, a combination of configured biasing.

FIG. 13 is in demonstration of a condensed segmented version of FIG. 1, in a trinity configuration of chambers. Illustrating a plan view sequence of an oscillation, performed intransposition and DDD, in a 0 degree travel inertia configuration. The chamber EEs are configured for full EE dissipation, working an effective and efficient deceleration result of oscillation cycling, in transposition and DDD of a travel inertia.

FIG. 15 illustrates a vehicle featuring a CPS Isolation Control System with integration of the system design elements. The embodiment vehicle unprotected mass, UPM delineated elements include a UPM vehicle chassis frame 123, providing structural integrity, connection and distribution of the vehicle mass and forces. A chassis forming outer containment of a UPM chamber 122, also, serving as a primary structural impact member of the vehicle, in protection of the passengers and the embodiment chamber. Protected mass, PM 111 delineated elements, include passenger seating, a foot rest of a full or partial floor plane, plus PM integral restraint and connections. A floor plane may further form horizontal structural connection of the PM 121 chamber. The PM comprising an integral or whole form. A surface in accommodation of a passenger foot, during performance of an embodiment oscillation cycle, may comprise a support plane, in parallel with the foot bearing plane, in connection with a PM 111 element. By way of example, a PM vehicle floor, or plane attached directly or indirectly to a PM element, maintains a dimensional placement of the foot, knee and leg, during an embodiment cycle displacement of the PM. The vehicle chassis may comprise a varied composition of structural materials available in the art, and in growing acceptance for manufacture, including impregnated fabrics . . . .

Protection of the PM is extended to provide response to an intruding vector, based on its position in relation to the embodiment. The embodiment may use a system of sensors in detecting presence of an intruding vector attributes, for signal communication with an ECU 800. Upon detection, a projected point of vector transfer or current point of vector transfer is determined, and the association of a gait is established. A gait system for application of isolation, deflection and dissipation control is provided. The term gait, is defined as a configuration of embodiment elements qualified by attributes of the intruding vector. The implementation of a gait is qualified by the bearing and product of travel inertia upon a point of vector transfer, forecasted, and physically identified. Vector and mass characteristics of the intruding and embodiment associated mass, qualifies a set of dampen resistance values armed in the inertia disposed path of the PM. Providing a predetermined and substantially isolated configuration, where the structures confine and define a protected dissipation path, in an isolated alignment of the PM inertia, from the UPM. It may also become apparent as a range of dissipation, magnitude of resistance in the elastic elements, the number of elastic elements, cells and sets, with their associated chamber elements, scale of the embodiment features, capabilities of reinitiating elastic elements, the chosen form of elastic elements, and combinations are features of magnitude and preference comprising the embodiment. Plus the fixed and variable aperture modulation applied in the art. It is yet expected the methods of implementing the required dampen, deflection and dissipation features of the embodiment, also have a bearing in its magnitude of effectiveness and efficiency. Wherein a wide range of isolation resources is available to address the economic, comfort, and preferred safety priorities per the environment of each application.

At activation, one set of the chambers can be connected to a chassis/frame and the other connected to the designated PM, as described above.

Having described an underlying concept for a CPS isolation control system, the following describes a control system for controlling and activation of the CPS isolation control system.

The proceeding illustrations promote clarification of the ECU 800 role, in identifying and applying largely optimal resistance rates of the elastic element(s) 130 to the PM chamber 121, for conversion of the PM inertia to heat and dissipation. The word optimal is used in context of employing tactful response, in recognition of priority for tasks or demands involved, for the most auspicious solution. By way of example, the rate of acceleration, or g's, versus biological data, versus the rate of resistance required for full dissipation, versus quantity of resistance available at select rates for the existing mass inertia, versus tested capabilities of system performance. It is expected the synthesis of data will work a prioritized best solution, within capable bounds of the embodiment design.

FIG. 14 illustrates an ECU 800 for control and execution of the CPS isolation control system. ECU 800 includes a processor 805, a memory 810, one or more sensor inputs 815, and one or more outputs 820. ECU 800 may be implemented separately or as part of another control unit, such as an auxiliary control unit.

Processor 805 may be any device or combination of devices that executes instructions, where the instructions may be hard coded or soft coded, or a combination of hard and soft coded. By way of example, processor 805 may be, or may include, a microprocessor, microcontroller, digital signal processor, field programmable gate array (FPGA), application-specific integrated circuit (ASIC), or direct memory access (DMA) unit. For soft coded instructions, processor 805 may read instructions from memory 810.

Memory 810 may include volatile and nonvolatile memory sections or structures. By way of example, memory 810 may be implemented as a volatile random access memory (RAM) semiconductor integrated circuit in combination with a flash memory integrated circuit. Portions or all of memory 810 may be included in processor 805.

Sensor inputs 815 receive data from sensors. By way of example, sensor inputs 815 may receive data such as ambient light intensity, temperature, pressure, and humidity. Other examples include sensor inputs 815 for pre-impact presence or distance sensors such as radar or LIDAR (light detection and ranging) sensors, commonly referred to as "anticipatory crash sensors", featuring mass characteristics detection and identification libraries, for pre-impact data Yet other examples include sensor inputs 815 for PM, UPM, and/or vehicle status sensors such as position, speed, velocity, acceleration, yaw, pitch, roll, direction, occupant weight, pressure, force, vector datum and status, fluid level, pressure, brake engagement, and engine or transmission torque. Sensor associated data 815 may be stored in memory 810.

Processor 805 monitors the PM, UPM, and/or the vehicle and its occupants by analyzing data from sensor inputs 815. Processor 805 may also monitor nearby vehicles by analyzing data from sensor inputs 815. Processor 805 may determine the anticipated and concurrent force vector source and intrusion characteristics, and may provide a signal to an output 820 initiating a response of one or more signal receivers of the embodiment in the vehicle.

Output 820 may be one or more drive circuits or drive devices providing voltage, current, or frequency to an external device upon receiving a signal from the processor. By way of example, output 820 may be a field effect transistor (FET) that is switched on by processor 805 to provide a signal to an elastic element, valve, actuator, hybrid or sets for arrangement of force transfer elements.

ECU 800 is in determination and exhaustive concurrent identification by signal of sensor and processor, of the environment, intruding mass and embodiment vehicle libraries, and characteristics of mass, vector physics, bearing, directional components, collinear and secondary, in discovery of the product of vector attributes applicable to each mass. Using such information, ECU 800 may initiate a sequence of any variety of PM responses. By way of example, multiple force transfer components associated with a vector containment chamber set, may be sequentially initiated. By way of another example, processor 805 may select alternate resistance configuration in initiating an elastic element(s) at re-initiation, or configurations related to processing oscillation at the chambers.

ECU 800 may determine the status of chamber 121, 122 and elastic element 130 forces, from local and alternatively located sensor inputs. Accordingly, ECU 800 may initiate a sequence of responses, or sequentially initiate single responses, based on an array of sensor, program and library data input.

ECU 800 may manage physiological stress profiles, sudden acceleration event histories, and mass identification data stored in memory 810, for processor 805 to command a response using the most efficient resolve of the event, in minimizing shock, trauma and/or discomfort of the occupants.

ECU 800 may manage monitoring a relationship of the PM to the UPM, recognized as the angle of incidence of the two masses, occurring in the chambers during the course of an acceleration event. A sensor or sensor set is provided proximal to the chambers, in communication with the ECU or processor, providing status of this relationship. Laser type sensors being recognized in the art for monitoring mass activity. Variations of the measurement result from effects of the stochastic vector magnitude, acceleration, length and frequency upon the elastic element(s). The PM and valve positioning, valve articulation, dissipation rate, and the method of dampen isolation may also contribute to variation in the angle of incidence. Providing for an immediate measured relation of the PM to the UPM, for an additional data available prior, during and following the dissipation cycle.

The embodiment and its configuration provides a design facility. Selectively extending protection beyond occupants to cargo, interior planes of the cabin, floor, ceiling, designated compartment(s), a whole cabin or most any set of elements may be determined by the OEM for a particular vehicle design. It may be preferred, a set of elements be qualified by the degree of physical protection available from intrusion, during an acceleration event. By way of example, referring to FIG. 6, a set of PM, comprising the seats and their interconnection to the embodiment near a center axis of the vehicle provides a protection from physical interference.

Control units, memory, processors and sensor hardware, software and programs are available on the shelf from manufacturing vendors. Programming and hardware systems are immediately available in the present art, from vendors of the automotive oriented and other markets suited for addressing and implementing the accelerated dynamics and responsibilities inherent of the embodiment role.

In consideration of the materials for fabrication of the embodiment:

The torus-like, toroidal form and structural demands of chambers 121 and 122 are conducive to application by many materials. Metals are suitable for the embodiment from molded, pressed, stamped, cast, tubular, plate or sheet of steels or aluminum alloys, in lamination, composite, or composite formed hybrid materials and honeycomb, oven braze, weld and most methods of metal forming and joining can satisfy purposes of an experimental prototype.

It is expected, as a result of the recent 54.5 mpg standards, the industry will be in permanent demand of high strength to weight materials. Composites of glass and/or fiber of carbon, carbon fiber reinforced nylon, aramid and others are commonly used for structural applications, as it is to be anticipated for the embodiment also. An S glass may be preferred for economy with hybrid reinforcing.

Varieties of synthetic rubbers, plastics and films are available as the primary containment body material of the elastic element 130. Weave, patterning, lamination and composition of body material may vary, in consideration of economy, performance, structural demand, size or form of each elastic element. Nylon, carbon, aramid and glass fibers and metals serve as elastic element structural reinforcement components in many similar products. Surface texturing of the elastic element, or its contact surface areas may be adjusted. The application of PTFE or other polymer lubricant and/or protective barrier to the elastic element, or its contact surfaces may be required before a satisfactory frictional co-efficient or strength is established. Presently, high strength and heat resistant properties found in polyarletherketones, and other high performance polymer films promoted by those of the art in the marketplace are anticipated.

The elastic element is also largely cylindrical in shape and serves high structural demands, plus optional requirements of flexibility. Varying properties of elasticity are expected, as diverse design properties are sought. The elastic properties required of the embodiment may be derived from the relation of the element properties contained within the walls, to the properties of a containment element 130, or in combination. By way of example, a flexible non-elastic containment element 130, in conjunction with a visco-elastic fluid. Where the fluid provides the source of dampen, dissipation and elasticity. An active means of control through one or a plurality of valves is anticipated at the EEs. In contrast, 130 may be frangible or elastic, in single or composition of a solid, woven, composite, fiber, film, or interlayments of material, or hybrid materials, properties and/or methods. And, may vary by its means of active or passive activation, form, composition, performance and range of material properties within a same embodiment or application. Plentiful gas generation, by direct mixture of outside air is available without concern of passenger safety.

In addressing mass manufacture of the PM and UPM chambers. Their shape has a noted circular component, conducive to using robotic, high speed automation, in a precise fabrication process. Filament winding is used to derive economic, weight and strength benefits available to the OEM and consumer, in products of similar form. The process uses low cost materials, yarn rather than fabric, less material and waste, with less labor, handling and transport costs than many other forms of component manufacturing. A closed press is a likely and well established method of intermediate, or final forming of the structure. Thermoplastics may also be considered.

For purposes of introduction clarity, elements of the PM are not restricted to those graphics or descriptions contained here. The PM is composed of those elements or set(s) desired at design of the system. By way of example, interior components, cargo storage area, floor, seating, dash, occupant restraining device, ceiling, or any element sought, for protection from impact forces. A vehicle may comprise a cargo designated area with the facility to secure wheelchair and occupants to the PM. And likewise, caged or otherwise secured pets may be afforded protection of the PM. And further, by way of example, a whole cabin or cargo assembly configuration of a vehicle may be allocated PM. Yet, further may embody one or more sets. By way of example, an embodiment designated for each seat, or seat set, and or in combination of connection.

Embodiments discussed here, also support alternative vehicle design approaches in vehicle safety. One example addresses the commonly employed concept of a safety crunch zone; a design of materials composing the protective envelope for vehicle occupants, used for energy transfer and dissipation to decomposition in a sudden acceleration episode, thereby providing a degree of protection to the occupants, by dissipation of force.

In contrast, the embodiment design may be driven to accommodate force transfer rates at many points on the stress curve, potentially including the forces of initial impact through final dissipation, depending on design priority. Minimizing the need for sourcing inertia based force dissipation. This capability provides manufacturers the opportunity to strengthen the surrounding protective envelope of vehicle occupants, rather than weaken it. Rather than allocating mass for dissipation, using mass for structural integrity of the vehicle.

By way of example, a vehicle door may currently be designed, using the mass to absorb and dissipate impact at a low stress point, rather than high resistance to decomposition. The result being, a prescribed dissipative value, leading to possible intrusion of the protective envelope and likely injury of the passenger at comparatively low impact. Whereas, the embodiment provides the majority of force protection and isolation for the protected mass. It can serve as a primary dissipation source by the OEM designers and others, in minimizing the dependency of vector dissipation being sourced from the chassis protective envelope. The vehicle retains more structural integrity through a hardened design, for furthering protection of its occupants. And, further results in the added benefit of a mass preserved for latter stage dissipation, if needed.

The reader may have determined, the embodiment is not restricted to providing protection for the occupants to one direction. The embodiment provides access of 360 degrees of stochastic force protection of the vehicle occupants, including their seating and restraint, and other mass secured to the vehicle occupant seating, or designated PM. The scenario of forces in a conventional acceleration episode, recognizes minimal isolation of shock transfer through the safety belt and occupant seat. The seat and belt are subject to full shock transfer. Simply stated, those elements are PM in the embodiment. This benefit is foreign to any previous occupant mindset and thereby the author finds difficult to overstate. The PM remains more substantially independent, subject to its own inertia as the force is dissipated. Substantial isolation and dissipation of secondary forces, may further intercede displacement of occupants and their restraint, providing a setting unrealized in the industry.

Regardless of impact direction, the configuration minimizes exposure of direct force transfer to the PM, as the relationship of intersecting masses deflects and dissipates energy transfer during the directed travel of the PM. Whereas conventional methods offer limited management of shock transfer to a linear instant, primarily of one direction. The embodiment provides further opportunities of control, foreign to the design, manufacture, safety, and insurance related industries, to the benefit of the consumer. The embodiment provides a format of control, permitting determination of when to initiate or reinitiate a resistance dampen force, its direction, length, magnitude and modulation characteristics, qualified by attributes of the sudden acceleration event and data library.

A comprehensive perspective of the embodiment application is required before its full benefits can be actualized. The PM elements remain secured from intrusion by physical structural means. In the event a 'soft dissipation envelope' is employed in the vehicle structural design, by way of example, intrusion of a vehicle through a 'soft' cabin door, or non-reinforced frame, may permit an intruding vehicle bumper interior of the cabin. More specifically, the PM is in free lateral suspension, and requires the freedom to associate. Consideration of PM proximity to interior items, frame and door strength are design issues to be identified and prioritized.

Recognition of the embodiment purpose as a dissipation and isolation tool, having one principal preference of its placement within the confines of a vehicle frame is only logical. A space being employed by a small percentage of vehicles concedes a minimal sacrifice of design priority for its application.

The device of the present disclosure is applicable to embodiments in vehicles of transport, or facility where a free association dampen, deflection and dissipation is sought for isolation control. In one embodiment therefore, a CPS isolation control system, comprises a first structure configuration, of a protected mass or PM, comprising a PM chamber. And, a second structure configuration of an unprotected mass or UPM, comprising a UPM chamber. A moveable attachment of the PM to the UPM is provided. And an elastic element is configured to interpose elastic properties at the PM and UPM chambers, and a sensor provided for signal communication with an ECU, in further signal with the elastic element and a selective attachment of the PM to the UPM. Thus, a free association of the PM is established, and positioned to a predetermined attitude for reception of a vector transfer, following signal of the ECU initiating the system. The PM is subjected to its own inertia, in a format isolated of the UPM, traveling a deflected dissipation path in a measured and modulated dampen resistance selected of the ECU. Isolation, transpositioning and DDD of a vector is performed in two or more degrees of freedom, in the embodiment datum as described here.

In some embodiments, the sum of PM and UPM chambers may be greater than two.

In some embodiments, the device comprises an elastic element between each chamber and each adjacent chamber. Being toroidal, and disposing alignment of the structures to form an osculatory configuration of the chambers. The configuration is controlled by an ECU in response to an intruding vector, the PM mass characteristics plus dampening of the chambers. The elastic element form(s) remain toroidal throughout the cycle of initiation to final dissipation. It is noted, an elastic element form may be a constituent part, or a whole elastic element form. However, configurations of the chamber and elastic elements are not restricted to the representations provided here. As their location and form may vary by orientation, placement in the chamber, size and number, as designed for a variety of transposition and DDD initiation methods. In recognizing the scale of diversity in vehicle use, requirements of the device are diverse in the range of a mass scale being protected, the degree of protection, the physical allocated area of the embodiment, and further method or design priorities. An arrangement of elastic elements may comprise a radial or linear sector configuration, for a sequential or monolithic, full or partial dissipation, or transposition performed within a sector, gait, gaits or gait set. The scope of a sector is defined by each embodiment. A sector may comprise association with one or more directional degrees of freedom. And yet, in some embodiments, a recurrence of dampen force is provided in a sector, as additional vector deceleration and isolation, providing further alacrity in lengthening a deceleration history and further obviating stress to the PM. This recurrence may be provided in series, sequentially or monolithic, in any number of times or cycles, implemented in uniformity or non-uniformity, from a method order determined by the ECU.

In some embodiments the elastic element may be a composition of elastic elements comprising an actuator as required.

In some embodiments, each elastic element is in contact with both adjacent chambers, and further, some embodiments may have each elastic element disposed at the opposite direction, within the chamber, relative to the adjacent elastic element.

A preferred embodiment may have a transfer of early stage dissipation gasses to elastic elements of an alternate alignment or other supplemental set of elastic elements staged for later dissipation, serving as the sole or contributing charging force.

In some embodiments, the distance between the center of the chambers of the first structure and the center of the chamber of the second structure is greater than 7% or 10% of the chamber diameter.

Also provided, in some embodiments, is a vehicle comprising the CPS isolation control system, wherein the first structure is affixed to the body or frame of the vehicle. And the second structure is affixed to a seat in the vehicle, and wherein the greater proportion of volume at a two dimensional plane section of the chamber areas, is viewed horizontal, or in plan.

In some embodiments, the device is configured such that upon initiation of the system, the position of the chambers is nonconcentric, being oriented differently to the observer, as viewed from each side of the vehicle.

In some embodiments, the isolation control device comprises an elastic element, interposing a set of chambers. And, those chambers being disposed to a point tangent an opposing mass chamber, in an origin opposing the elastic element. And in some embodiments, a vector path may be provided in alignment with distal points of the elastic element(s), being 90 degrees opposite the major resistance contained at midpoint of the elastic element(s). The configuration provides for an immediate tangent relation of the chambers at initiation of the system at vector transfer, and following through to final dissipation of the vector. The configuration of form and resistance supports minimal disturbance of the chambers, as their alignment is isolated of dissonant forces and in a direction committed to the vector influence.

And in addition to the above, a vector path is provided in some embodiments, or electively influenced, by configuration of resistance values prepared in the elastic element(s), by the ECU or otherwise, corresponding to the preferred dissipation path. And is some embodiments, a distal point, edge, or structural value and form changes of the elastic element(s) may also serve in the embodiment as a resistance value influence, independent, or in association with other resistance value manipulation performed in the elastic element. Providing resistance value contrasts in an EE, segments or cells to exist in the EE with, and without the presence of an active valve control facility.

In some embodiments, the set of all vehicle, cargo and occupant elements are prescribed or designated to one of two subsets, as a protected mass, PM, or unprotected mass UPM. An isolation control device, comprising an assembly of respective chamber elements, is operatively connected to an associated PM and UPM of a vehicle. An exploding head bolt or an alternative disconnection facility is in signal communication at the activation of the device. In result, the PM is isolated from the effects of the UPM. The dampen elastic elements respond to the gait activation, configuring the chamber elements for reception of the intruding vector, based on the vector data. A vector transfer is performed, transposing the linear inertia vector to follow the contained, deflection, dampen and dissipation path of the chambers, in isolation of the UPM vector.

Protection from forces during sudden acceleration is not limited to occupants in a seat configuration. Some embodiments extend protection to any mass of the PM designated set, as identified by the OEM or designer. Configuration of the embodiment may provide isolation of any mass associated with the vehicle, containing a stable dimensional relation and connection with the PM chamber while independent from interference of the vehicle UPM or other mass. Protection of the PM elements from interference of its free—associative isolation is required for proper functioning of the embodiment.

A CPS isolation control system method entails a vehicle and CPS isolation control system be provided, and classifying objects of mass associated with the vehicle into two classifications. Identifying those objects to receive protection, as protected mass or PM, and objects otherwise as unprotected, or UPM. Sequentially, providing information, such as identifying the speed, acceleration, mass characteristics, direction and position of an intruding vector relative to the vehicle. Including any ramifications of its presence upon the vehicle. Also, a set of current vector and mass characteristics present in the vehicle and embodiment, including the PM weight and force activity, plus any protected occupant or cargo data influencing performance of the embodiment may also be provided. An isolation of the PM is then established at its disconnection with the UPM, providing its lateral free-association. Providing for an alignment of the PM elements conforming to a prescribed, qualified gait or position, determined by the ECU 800. A vector transfer is performed, influencing direction of the PM in its protected dissipation path, where a measured dampen resistance and dissipation is performed.

The CPS isolation control system and method will further comprise, providing signal communication of the controller to the actuators, elastic elements or valves associated with the determined gait. Causing the elastic elements to be armed with the prescribed resistance value(s), based on the sequence timing(s), dissipation rate(s), processed and stored data, accessed by the ECU. Thus, the PM is transposed in opposition and deceleration of an inertia influence upon initiation of the gait. The PM is further transposed to a centripetal path, as the linear or stochastic vector performs in a contained dissipative format, managing the direction, path, dampen and dissipation rate of the PM, while isolated from effects of the UPM In furthering the isolation control system method a continuing sensor signal of the concurrent vector, UPM and PM status' is delivered to the ECU following initiation of the CPS isolation control system. A preferred set of vector dampen values is provided with a prescribed method in timing based on the updated system status and database contrasts or determinations. Where a modified or alternate dampen isolation is delivered through the embodiment adjusting for real-time conditions of the incident.

The CPS isolation control system method may include a modulation of resistance delivered through the elastic elements by the ECU. And a method may also include re-initiating the gait system, at least one additional time, in part, or whole, by direction of the ECU 800, in transposing of the PM in deceleration of the inertia vector influence and configuration for a DDD, by result of a signal of the vehicle or embodiment status.

The CPS isolation control system method may further comprise re-initiating elastic element(s), at least one additional time, in part, or whole, by direction of the ECU 800, in result of sensor signals of the vehicle or embodiment status. The frequency of re-initiating the elastic element(s) can be employed in an oscillation of resistance force and direction delivered the PM, regardless of the magnitude or percentage of displacement of its position, or form to effect an acceleration of dissipation and deceleration. Any desired deceleration, dissipation rate or method will vary according to the vector load and status of the PM.

A CPS isolation control system and method may provide on-going protection during the course of vector transfer and dissipation by providing continual sensor communication, in monitoring concurrent vector, vehicle and embodiment status for signal to the controller. And further providing for an adjusted set of dampen values or method(s). By way of example, a sequential resistance timing delivery, or a simultaneous system refresh of resistance values is delivered to the sector chambers, based on the derived status' and system database contrasts. And, by further example, the prediction by sensor of an additional vector influence, requiring an alternate gait, during or following a present initiation also requires determination by the ECU. Modified or alternate dampen methods are anticipated to be delivered through the embodiment, in adjusting for real-time conditions of an incident.

Alternative embodiments include a system with:

at least one elastic element or vector transfer control element;

at least one division of an elastic element, providing at least 2 cells contained about an elastic element;

at least one elastic element or cell, having at least one valve control element or feature, being passively controlled, without signal from a controller, monitor or sensor;

at least one elastic element or cell, having at least one valve control element or feature, in signal communication with a controller, monitoring or sensor device;

at least one elastic element or cell, having at least one valve control element, or feature to provide release, and or transfer of an hydraulic force transfer medium, independent of other elastic element or cell;

at least one elastic element or cell, having at least one valve control element, or feature to provide sequential release, or otherwise, and transfer of an hydraulic medium, for contribution to a circuit, reservoir, cell or elastic element; and at least one integrally formed elastic element or set, including, by way of example: A backing, or similar modular, or integrating body element, providing position, containment and/or attachment features, for the efficient placement of elastic element(s) and associated sensor(s), valve(s), signal transmission and/or select embodiment hardware, in whole, or for each designed segment, prior, during and/or following installation. Thus, a modular installation and/or removal, selective configuration facility, enabling efficient modification, repair or maintenance.

Alternative embodiments further include a system that employs:

A hybrid or combination, gear or gears, cam or cams, hydraulic set of force transfer agents and/or elastic elements in conjunction with:

an epicyclic assembly of gears;

a rotary dampen device;

a rodless or cable cylinder dampen device;

a torsional force transfer device with hydraulic chamber; and a piston lug cylinder.

Alternative embodiments further include a system that is configured with:

integrally formed elastic elements fitted within the chamber elements for enhanced delivery efficiency and stability in element chamber positioning;

a detachable elastic element storage containment system, including delivery actuation fittings and hardware; and chamber elements enabling performance in one to six degrees of freedom, inclusive, for applications in aviation, seismic isolation of buildings, civil engineering infrastructures and acceleration ranges related to occupant safety, comfort and cargo protection of train, auto, air and water transports.

Alternative embodiments further include a system employing or performs a modified period characteristic of a pendulum, employing one or more of the following:

a foreshortened pendulum suspension, configuring the suspension length of one or more legs to approximately equal, or correlate to the distance from a pendulum axis, to a plane, representing a selected stroke distance of an elastic element. At full extension, the configuration may require the protected mass, PM, to transfer an prescribed force value of an elastic element stroke, expressly while being elevated or extended within an EE range, or a chosen point from its rest, uncompressed or extended position;

an unstable pendulum suspension or leg;
at least one fixed plane lateral suspension;
at least one pendulum fixed plane suspension;
at least one suspension pendulum; and
any free associative suspension.

Alternate embodiments may include increased segmentation or numbers of sectors, chambers and/or elastic elements of a poloidal, toroidal or radial coordinate.

Alternate embodiments may include segmentation of an embodiment datum form in consideration of alternate design priority of embodiment position, displacement and function.

Alternate embodiments further include a plurality of chamber sets comprising an embodiment. Wherein the chambers may perform independently in a synergistic fashion. By way of example, in a three chamber set configuration, one offset or central chamber may anchor and further isolate, as a majority of oscillation cycling is performed in the two remaining directional opposing chambers, as the EEs render deceleration of the PM, by DDD and transposition cycling of the PM.

Alternative embodiments further include a system with two or more, in number of an approximate embodiment, featuring coordination of their electrical, signal or mechanical interconnections.

Alternative embodiments further include a system that is configured for distribution of forces using a radial assembly of bearings or rotational transferring elements, fitted internal and/or external of the chamber elements.

Alternative embodiments further include a system that is configured to change the numbers, or dimensions of chambers or elastic elements, for modular alteration of an isolation value, dampen frequency or magnitude ranges, offered by an embodiment.

Some embodiments further include a system capable of modifying duration of the dissipation cycle, by way of example, providing replenishment of an hydraulic, or force actuation to the elastic element(s), as the embodiment may or otherwise, simultaneously perform dissipation of an intruding vector. And provide a continuous cycling of dampen/dissipation properties, before full dissipation.

Throughout the disclosure, the CPS oscillation isolation control system is a CPS dampen, dissipation, deflection and isolation control system, and is also referred to as a CPS isolation control system, and may refer to or associate any of its functions or attributes, recognizing the embodiment as a system, regardless of the presence of any function, method or attribute in a particular application.

What can be claimed is a centripetal phase shift CPS oscillation isolation control system in a transposition and deflection dampen dissipation DDD gait configured in a vehicle inertia acceleration episode comprising: a first structure configuration of a designated mass comprising a chamber element; a second structure configuration of a designated mass comprising a chamber element; an elastic element EE interposed at the chamber elements; a gait configuration system comprising: a delineation of the vehicle and associated mass as protected mass or PM for the first structure and unprotected mass or UPM for the second structure; a selective connection of the PM to the UPM in signal with an electronic control unit, ECU; a moveable attachment of the PM to the UPM; a configurative instruction of an ECU comprising: an identification of a vector transfer of the embodiment vehicle and intruding mass intersecting masses, a transposition and DDD configuration of a PM being qualified by the identification of a bearing and product of travel inertia upon a vector transfer of intersecting masses at the chambers, and a PM being in disconnection of the UPM, and a PM being in transposition upon initiation of a gait configuration, and a PM being decelerated in a direction opposite a collision mass by result of a transposition, and a PM being configured to a DDD path, direction, timing and resistance, and a PM being decelerated in a direction towards a collision mass, by result of a DDD, and a PM being in substantial isolation of the UPM, and a PM being decelerated in oscillating configured directions.

What can also be claimed is a transposition and deflection dampen dissipation DDD gait configuration of a vehicle centripetal phase shift (CPS) oscillation cycle isolation control system during an inertia acceleration event, comprising: a first structure configuration of a designated mass comprising a chamber element; a second structure configuration of a designated mass comprising a chamber element; an elastic element EE interposed at the chamber elements; a gait configuration comprising: a delineation of the vehicle and associated mass as protected mass or PM for the first structure and unprotected mass or UPM for the second structure; a moveable connection of the PM to the UPM; a selective connection of the PM to the UPM; an identified gait comprising configurative instruction for the alignment of a PM inertia vector to a DDD path in isolation of a UPM qualified by a set of embodiment vehicle and intruding mass bearing and product of travel inertia upon a vector transfer comprising: a partial identification of a vector transfer, an accurate denotation of rotational adjustment or a vector directional influence product being not available prior to a required initiation of a system gait configuration, or a gait configuration being initiated prior to a full identification of a secondary travel inertia vector bearing, completion of a travel inertia vector rotational adjustment, or otherwise less than full identification determining a travel inertia vector bearing and product status is indicated in configuring response of the system to a vector transfer at the chambers, and a gait configuration being identified and initiated, plotting the PM to an embodiment datum, utilizing vector activity gleaned of the ECU, prior to a required implementation of a gait, and a transposition phase of an oscillation cycle being performed upon initiation of a gait configuration, and a PM being decelerated in result of a transposition, and an identification of an inertia vector influence direction being furthered refined by result of a PM DDD directional response indicating a position proximal the predominant bearing location of a secondary inertia vector influence source following initiation of the system, and a configuration adjustment of EEs being identified in allocation of resistance at the chambers, and an adjustment of resistance being distributed at the chambers, and a PM being accelerated in exposure of inertia, and a PM being decelerated in performance of a DDD configuration, and a PM being in substantial isolation of the UPM.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or sub-combinations that are disclosed herein as other present disclosures in other patent documents is hereby unconditionally reserved.

What is claimed is:

1. A centripetal phase shift (CPS) isolation control system in a sudden acceleration episode of a vehicle comprising:
   a first structure configuration of a designated mass comprising a chamber element;
   a second structure configuration of a designated mass comprising a chamber element;
   a delineation of the vehicle and associated mass as a protected mass (PM) for the first structure and an unprotected mass (UPM) for the second structure;
   a moveable connection of the PM to the UPM;
   an offset relation of the PM to the UPM;
   an electronic control unit (ECU);
   a selective connection of the PM to the UPM in signal connection with the ECU;
   an elastic element (EE) positioned at the offset;
   a gait configuration being identified and initiated, plotting the PM to an embodiment datum, utilizing vector activity obtained by the ECU;
   a configurative instruction for the ECU comprising:
      a partial identification of a vector transfer,
      a denotation of rotational adjustment, or a vector directional influence product being not available prior to a required initiation of the gait configuration or the gait configuration being initiated prior to a full identification of a secondary travel inertia vector, or otherwise less than full identification determining a travel inertia vector and product status is indicated in configuring a response of the system to a vector transfer at the chamber elements, and
      wherein the configurative instruction is applied by the ECU to derive a deflection, dampen and dissipation (DDD) configuration;
   an oscillation cycle having a transposition phase being performed upon initiation of the gait configuration, the PM being decelerated as a result of the transposition phase;
   an identification of an inertia vector influence direction indicating a position proximal to the predominant location of a secondary inertia vector influence source applied to the UPM following initiation of the system;
   a configuration adjustment of the EE being determined in response to the secondary inertia vector influence source and being applied at the chamber elements;
   the PM being accelerated in response to exposure to the secondary inertia vector influence source;
   the PM being decelerated in accordance with the DDD configuration; and
   the PM being in substantial isolation of the UPM.

2. A vehicle featuring an integrated set of CPS isolation control system design elements comprising:
   a first structure configuration of a designated mass comprising a chamber element;
   a second structure configuration of a designated mass comprising a chamber element;
   a delineation of the vehicle and associated mass as protected mass (PM) for the first structure and unprotected mass (UPM) for the second structure;
   a set of PM delineated elements comprising:
   a passenger seat,
   a set of passenger restraint elements with integral PM connection;
   a foot rest comprising a plane parallel with a foot bearing;
   a set of UPM delineated elements comprising:
   a vehicle chassis frame integrated structural element comprising:
   a structural connection and distribution of a vehicle mass and force, and
   a form integrating containment of a UPM chamber element, and
   a formed structural collision impact member;
   a PM set of vehicle to isolation control system integrated elements being an integral form in substantial isolation of a UPM upon initiation of the CPS isolation control system;
   a UPM chassis frame being a form integrated containment of a UPM chamber;
   a UPM chassis frame being in structural collision impact protection of a UPM chamber;
   a UPM chassis frame being in structural collision impact protection of a vehicle UPM and PM elements including a passenger.

3. A centripetal phase shift CPS oscillation isolation control system in a transposition and deflection dampen dissipation DDD gait configured in a vehicle inertia acceleration episode comprising:
   a first structure configuration of a designated mass comprising a chamber element;
   a second structure configuration of a designated mass comprising a chamber element;
   an elastic element EE interposed at the chamber elements;
   a gait configuration system comprising:
   a delineation of the vehicle and associated mass as protected mass or PM for the first structure and unprotected mass or UPM for the second structure,
   a selective connection of the PM to the UPM in signal with an electronic control unit, ECU, and
   a moveable attachment of the PM to the UPM;
   a configurative instruction of an ECU comprising:
   an identification of a vector transfer of the embodiment vehicle and intruding mass intersecting masses,
   a transposition and DDD configuration of a PM being qualified by the identification of a bearing and product of travel inertia upon a vector transfer of intersecting masses at the chambers;
   a PM being in disconnection of the UPM;
   a PM being in transposition upon initiation of a gait configuration;
   a PM being decelerated in a direction opposite a collision mass by result of a transposition;
   a PM being configured to a DDD path, direction, timing and resistance;
   a PM being decelerated in a direction towards a collision mass, by result of a DDD;
   a PM being in substantial isolation of the UPM; and
   a PM being decelerated in oscillating configured directions.

* * * * *